United States Patent
Wakui et al.

(10) Patent No.: US 9,881,001 B2
(45) Date of Patent: Jan. 30, 2018

(54) IMAGE PROCESSING DEVICE, IMAGE PROCESSING METHOD AND NON-TRANSITORY COMPUTER READABLE RECORDING MEDIUM

(71) Applicant: Konica Minolta, Inc., Chiyoda-ku (JP)

(72) Inventors: Katsuaki Wakui, Toyokawa (JP); Hideyuki Hashimoto, Toyokawa (JP); Takahiro Tsutsumi, Toyohashi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 134 days.

(21) Appl. No.: 13/916,794

(22) Filed: Jun. 13, 2013

(65) Prior Publication Data

US 2013/0339002 A1   Dec. 19, 2013

(30) Foreign Application Priority Data

Jun. 18, 2012   (JP) .................................. 2012-136525

(51) Int. Cl.
G06F 17/21   (2006.01)
G06F 17/27   (2006.01)

(52) U.S. Cl.
CPC ................................ *G06F 17/2795* (2013.01)

(58) Field of Classification Search
CPC ................ G06K 9/00; G06K 9/00442; G06K 2009/00489; G06K 9/36; G06K 9/4685;

(Continued)

(56) References Cited

U.S. PATENT DOCUMENTS 5,978,754 A * 11/1999 Kumano ............. G06F 17/2872
704/3
6,393,443 B1 * 5/2002 Rubin ...................... G06F 17/22
715/236

(Continued)

FOREIGN PATENT DOCUMENTS

| JP | 10-307839 A | 11/1998 |
| JP | 2004-086307 A | 3/2004 |
| JP | 2010-287178 | 12/2010 |

OTHER PUBLICATIONS

Office Action issued in corresponding Japanese Patent Application No. 2012-136525, dated Oct. 21, 2014, and translation thereof.

*Primary Examiner* — Huyen Vo
*Assistant Examiner* — Rodrigo Chavez
(74) *Attorney, Agent, or Firm* — Buchanan Ingersoll & Rooney PC

(57) ABSTRACT

An image processing device, comprises: an input part for inputting image data; a word extracting part for extracting a word from texts contained in the image data; a synonym obtaining part for obtaining a synonym corresponds to the word, and for associating the obtained synonym with the word; a position identifying part for identifying a display position on the image data of the word with which the synonym is associated; a layer creating part for creating an accompanying layer to add to an original layer, which is the image data containing the word, and for embedding the synonym associated with the word within a position on the accompanying layer the same as the display position identified by the position identifying part; and an output image generating part for generating output image data including the original layer containing the word and the accompanying layer within which the synonym is embedded.

24 Claims, 18 Drawing Sheets

(58) Field of Classification Search
CPC .......... G06K 9/72; G06K 9/723; G06K 9/726; G10L 21/06; G06F 17/30253; G06F 17/30796; G06F 17/21; G06F 17/211; G06F 17/2276; G06F 17/2795
USPC ........ 358/456; 382/176, 177, 282, 290, 292; 704/9, 10, 276
See application file for complete search history.

(56) References Cited

U.S. PATENT DOCUMENTS

| | | | |
|---|---|---|---|
| 6,571,241 B1* | 5/2003 | Nosohara | G06F 17/30669 |
| 7,925,498 B1* | 4/2011 | Baker | G06F 17/2795 |
| | | | 704/10 |
| 2007/0206884 A1* | 9/2007 | Kato | G06K 9/72 |
| | | | 382/305 |
| 2010/0259560 A1* | 10/2010 | Jakobson | G06F 21/62 |
| | | | 345/629 |
| 2012/0005227 A1* | 1/2012 | Nagano | G06F 17/30702 |
| | | | 707/769 |

* cited by examiner

FIG. 4
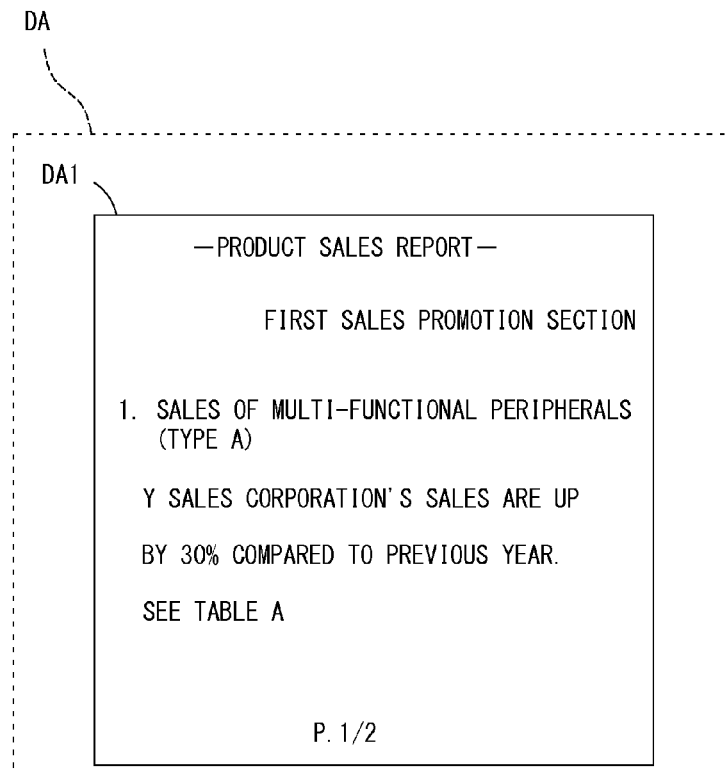
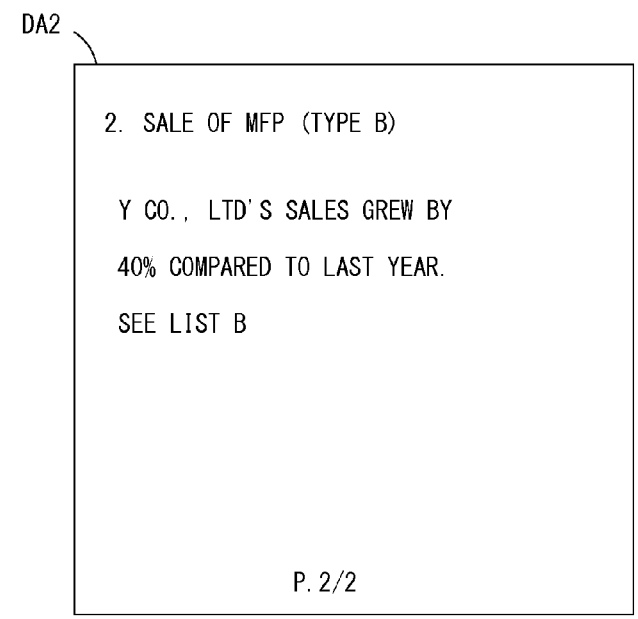

FIG. 5
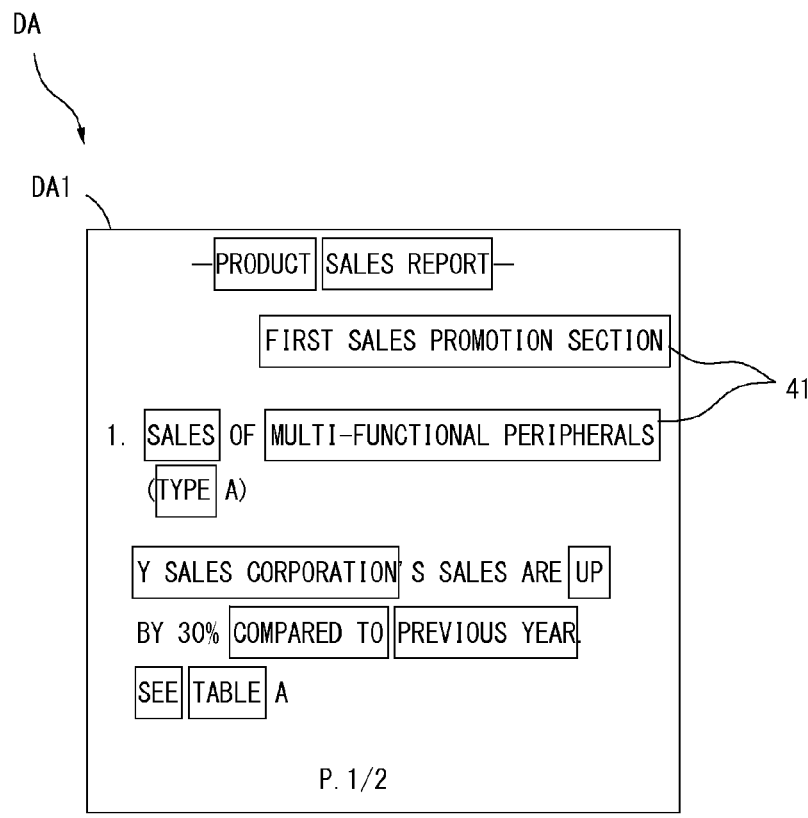
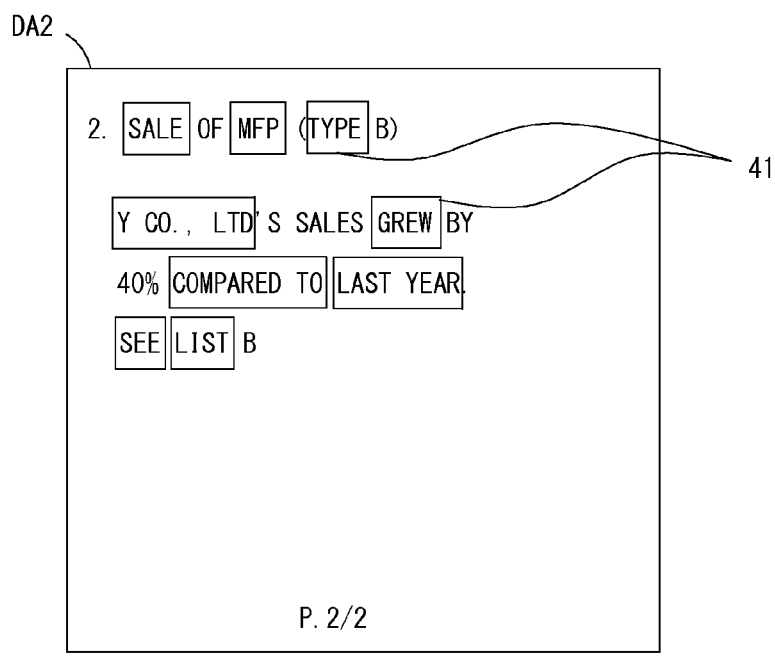

FIG. 6A

THESAURUS DICTIONARY  5a(5)

|  | WORD 1 | WORD 2 | WORD 3 |
|---|---|---|---|
| SYNONYM GROUP1 | MULTI-FUNCTIONAL PERIPHERALS | MFP | COPIER |
| SYNONYM GROUP2 | FIGURE | Fig. | CHART |
| SYNONYM GROUP3 | LAST YEAR | PREVIOUS YEAR |  |
| SYNONYM GROUP4 | SALES | SALE |  |
| SYNONYM GROUP5 | GREW | RISE | UP |

FIG. 6B

CUSTOMIZED DICTIONARY  5b (5)

|  | WORD 1 | WORD 2 | WORD 3 |
|---|---|---|---|
| SYNONYM GROUP1 | Y SALES CORPORATION | Y CO., LTD | http://www.Y. |
| SYNONYM GROUP2 | X CORPORATION | X CO., LTD | http://www.X. |
| SYNONYM GROUP3 | FIRST SALES PROMOTION SECTION | PROMOTION 1 SECTION |  |
| SYNONYM GROUP4 | SECOND SALES PROMOTION SECTION | PROMOTION 2 SECTION |  |
| SYNONYM GROUP5 | SALE | TURNOVER |  |

IMAGE PROCESSING DEVICE, IMAGE PROCESSING METHOD AND NON-TRANSITORY COMPUTER READABLE RECORDING MEDIUM

This application is based on the application No. 2012-136525 filed in Japan, the contents of which are hereby incorporated by reference.

BACKGROUND OF THE INVENTION

Field of the Invention

The present invention relates to an image processing device, an image processing method and a non-transitory computer readable recording medium. The present invention more specifically relates to a technique for easily searching a text in image data.

Description of the Background Art

In conventional offices, massive amounts of documents are managed in forms of image data generated through digitization of the documents. This type of image data is stored and managed in a predetermined data format such as PDF, for instance. Some image data desired by a user is searched and used among from multiple image data stored on a database. In such a case, a collective search is very often done by entering a search keyword.

Some of the multiple image data stored on the database have similar contents but described in different words, or the same word having more than one spelling or different written forms with the same meaning, which are called inconsistent spelled words. Even when the user performs an OR search, a searching for image data that match any of multiple search keywords, it is difficult to sort out all the inconsistent spelled words contained in the image data, resulting in failure to find all the relevant items.

There are various types of techniques for preventing failure to search all the relevant items as described above. Some of these known techniques are introduced for example in Japanese Patent Application Laid-Open No. JP 10 (1998)-307839 A (hereafter, document 1) and Japanese Patent Application Laid-Open No. JP 2004-86307 A (hereafter, document 2).

According to the known technique disclosed in document 1, a searching device allows a user to select a string appropriate for searching among from strings extracted by a fuzzy search, and easily realizes the suitable fuzzy search. This searching device extracts a string that exactly corresponds to a search string entered by the user and a string that is similar to the search string entered by the user from targeted documents, and allows the user to select a string should be used for the search among from the extracted strings. As the user selects the string that should be used for the searching, the search is done based on the selected string and a search result is obtained.

According to the known technique disclosed in document 2, a searching device that solves the problems of failure to search all the relevant items for a search by sentences in a natural language. For registering a document with a database, etc., this searching device is capable of providing a unique document ID to the document to be registered, and of extracting a word contained in the document to be registered to extract a word in a different expression, written form or spelling, which is a standard description of the extracted word. A document ID using the extracted word as an index is registered with data for search. The data for search is managed on the searching device separately from the registered documents. The data for search corresponds to each word registered as the index, and is generated as data with which the document ID of multiple documents containing the word is registered. When searching for the document, the word, which is the standard description, is specified based on the keyword, the search criteria, and the search is done for the specified word within the data for search, thereby obtaining the document ID corresponds to the word and extracting the document corresponds to the keyword.

According to the technique disclosed in the aforementioned document 1, the user needs to again select a string should be used for the search among from strings containing a string that is similar to a search string entered by the user after entering the search string, resulting in poor operability. The user may select wrong one when again selecting the string should be used for the search among from the strings containing the string that is similar to the search string. In such a case, the suitable fuzzy search is not performed, and there still may be a failure to search all the relevant items.

According to the technique disclosed in the aforementioned document 2, in order to extract the document containing the keyword entered by the user or the word that is similar to the keyword from the database with which multiple documents are registered, the data for search that contains each word, the standard description, and the document ID correspond to the data for search need to be registered in advance. Without the registered data for search, the document containing the keyword entered by the user or the word that is similar to the keyword may not be extracted. It is assumed, for example, the user sends a message that contains a document file registered with the database to another user by email. In this case, even if another user who received the message performs the keyword search into the document file contained in the message under a different environment, a word that is similar to the keyword may not be searched. If another user performs a search by entering a word that is not contained in the document file as the keyword, the word is not searched even though the document file contains the word that is similar to the entered keyword, resulting in failure to find the relevant item.

SUMMARY OF THE INVENTION

The present invention is intended to solve the above problems. Thus, the present invention is intended to provide an image processing device, an image processing method and a non-transitory computer readable recording medium capable of generating image data that allows obtaining a search result including a word that is similar to a keyword entered by a user for a search for the entered keyword without being influenced by an environment under which the search is performed.

First, the present invention is directed to an image processing device.

According to one aspect of the image processing device, the image processing device, comprises: an input part for inputting image data; a word extracting part for extracting a word from texts contained in said image data; a synonym obtaining part for obtaining a synonym corresponds to said word, and for associating said obtained synonym with said word; a position identifying part for identifying a display position on said image data of said word with which said synonym is associated; a layer creating part for creating an accompanying layer to add to an original layer, which is said image data containing said word, and for embedding said synonym associated with said word within a position on said accompanying layer the same as the display position identified by said position identifying part; and an output image generating part for generating output image data including said original layer containing said word and said accompanying layer within which said synonym is embedded.

Second, the present invention is directed to an image processing method.

According to one aspect of the image processing method, the image processing method, comprises the steps of: (a) inputting image data; (b) extracting a word from texts contained in said image data; (c) obtaining a synonym corresponds to said word, and associating said obtained synonym with said word; (d) identifying a display position on said image data of said word with which said synonym is associated; (e) creating an accompanying layer to add to an original layer, which is said image data containing said word, and embedding said synonym associated with said word within a position on said accompanying layer the same as the display position identified in said step (d); and (f) generating output image data including said original layer containing said word and said accompanying layer within which said synonym is embedded.

Third, the present invention is directed to a non-transitory computer readable recording medium on which a program is recorded.

According to an aspect of the non-transitory computer readable recording medium, the program executed on a computer to function as a system comprises: an input part for inputting image data; a word extracting part for extracting a word from texts contained in said image data; a synonym obtaining part for obtaining a synonym corresponds to said word, and for associating said obtained synonym with said word; a position identifying part for identifying a display position on said image data of said word with which said synonym is associated; a layer creating part for creating an accompanying layer to add to an original layer, which is said image data containing said word, and for embedding said synonym associated with said word within a position on said accompanying layer the same as the display position identified by said position identifying part; and an output image generating part for generating output image data including said original layer containing said word and said accompanying layer within which said synonym is embedded.

BRIEF DESCRIPTION OF THE DRAWINGS

FIG. 4 is an example of image data acquired by an image input part as a target of process;

FIG. 5 is an exemplary result of a word extracting process from the image data by a word extracting part;

FIGS. 6A and 6B are examples of a thesaurus dictionary and a customized dictionary;

DESCRIPTION OF THE PRESENT PREFERRED EMBODIMENTS

Figure 1:
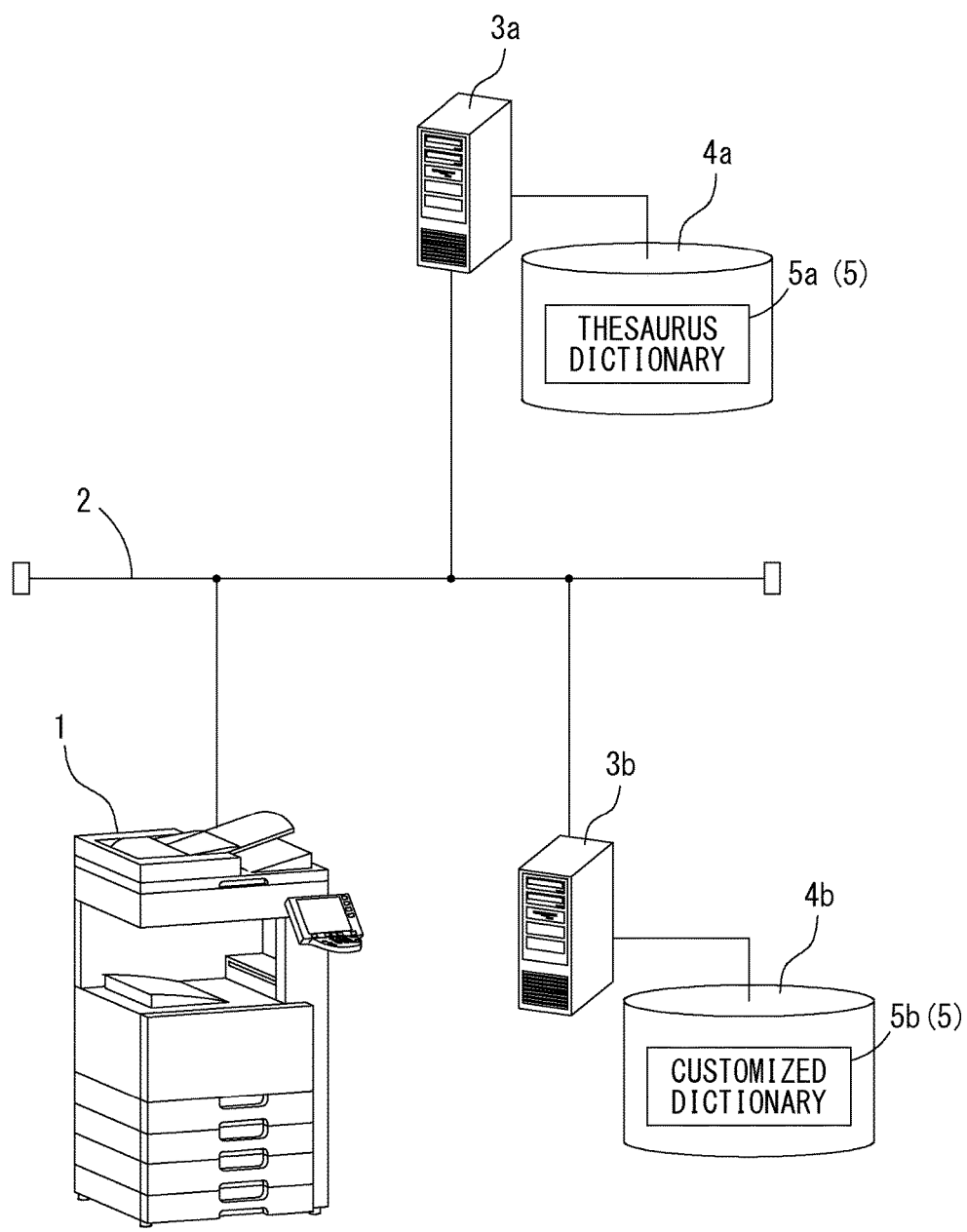
FIG. 1 shows an exemplary configuration of an image processing system comprising an image processing device.

Preferred embodiments of the present invention are described in detail below with reference to figures. In the description given below, those elements which are shared in common among the preferred embodiments are represented by the same reference numerals, and are not discussed repeatedly for the same description.

First Preferred Embodiment

FIG. 1 shows an exemplary configuration of an image processing system comprising an image processing device 1 of the first present preferred embodiment. The image processing system comprises the image processing device 1 formed from a device such as one of MFPs (Multi-functional peripherals) having multiple functions including scan, copy, fax, printer and image processing functions, for example, and servers 3a and 3b. The image processing device 1, the servers 3a and 3b are connected over a network 2 such as LAN (Local Area Network) or an internet to allow data communication with each other.

The image processing device 1 is capable of performing a variety of image processing. Especially the image processing device 1 of the first preferred embodiment is equipped with an image data generation function to generate image data that makes a search for a text contained in image data perform easily as one of the variety of image processing functions. The image data generation function is to extract a word (a single word or a term) contained in input image data, and to output by embedding a synonym that is likely to be relevant to the extracted word within a display position of the extracted word. The single word may be a word or a group of words (a term) that is given a specific meaning.

The server 3a is installed on the internet, for example. The server 3a includes a storage device 4a formed from a storage unit such as a hard disk drive. A thesaurus dictionary 5a that is electronic dictionary information is stored in the storage device 4*a*. The thesaurus dictionary 5*a* is a generally-used dictionary of synonyms (hereafter, synonym dictionary) 5 in which there are many words including common terms and standard terms, for example. The thesaurus dictionary 5*a* has its data structure that includes at least one word group, each of which having more than one common term and standard term, and that brings the corresponding word groups together between multiple similar synonyms.

The server 3*b* is installed with access to LAN set in an office, for example. The server 3*b* includes a storage device 4*b* formed from a storage unit such as a hard disk drive as well as the server 3*a*. A customized dictionary 5*b* that is electronic dictionary information is stored in the storage device 4*b*. The customized dictionary 5*b* is the synonym dictionary 5 in which there are many words including industry parlances and terms commonly used in a company registered by the users, for example. The customized dictionary 5*b* has its data structure that includes at least one word group, each of which having more than one industry parlance and term used in the company, and that brings the corresponding word groups together between multiple similar synonyms based on synonym setting configured by the user at registration of the word.

In the first preferred embodiment, the synonyms include an equivalent term, a word with similar meanings, a broad term, a narrow term, a relevant term, an original term, an abbreviation and a translated word.

In response to activating the aforementioned image data generation function, the image processing device 1 accesses the servers 3*a* and 3*b* over the network 2 and refers to the synonym dictionary 5 including the thesaurus dictionary 5*a* and the customized dictionary 5*b*, thereby obtaining at least one synonym that is likely to be relevant to the word contained in the image data. The synonym dictionary 5 including the thesaurus dictionary 5*a* and the customized dictionary 5*b* are not necessarily stored in the servers 3*a* and 3*b* connected over the network 2. The synonym dictionary 5 may be stored in the image processing device 1.

Figure 2:
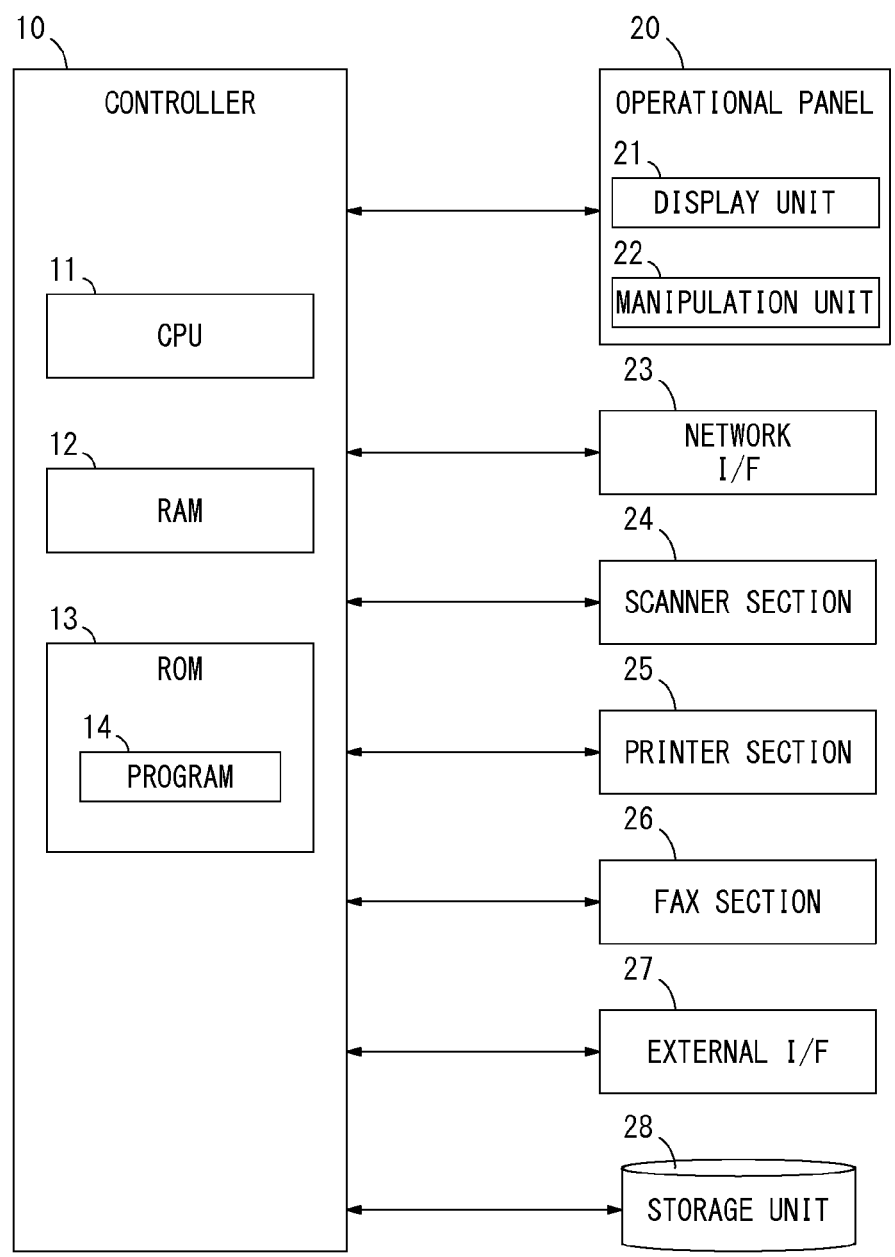
FIG. 2 is a block diagram showing an exemplary hardware configuration of the image processing device.

FIG. 2 is a block diagram showing an exemplary hardware configuration of the image processing device 1. The image processing device 1 includes a controller 10, an operational panel 20, a network interface 23, a scanner section 24, a printer section 25, a fax section 26, an external interface 27 and a storage unit 28.

The controller 10 controls operations of each of the operational panel 20, the network interface 23, the scanner section 24, the printer section 25, the fax section 26, the external interface 27 and the storage unit 28, and performs a variety of image processing. The operational panel 20, a user interface operable by a user in use of the image processing device 1, is provided with a display unit 21 on which various types of information is displayed and a manipulation unit 22 that receives entries of a variety of instructions by the user. The network interface 23 is for connecting the image processing device 1 to the network 2 to transmit and receive data over the network 2. The scanner section 24 is driven to read a document and generate image data thereof in response to an instruction from the controller 10. The printer section 25 is driven to produce a printed output by forming an image on a sheet such as a printing sheet based on print data received from the controller 10. The fax section 26 transmits and receives fax data over a network such as public phone lines not shown in figures. The external interface 27 is for connecting an external memory such as USB (Universal Serial Bus) memory, for instance, or other external devices thereto. The storage unit 28 is formed from a nonvolatile storage device such as a hard disk drive to store therein image data and/or other data.

As illustrated in FIG. 2, the controller 10 includes a CPU 11, a RAM 12 and a ROM 13. The CPU 11 is a computation unit that reads and executes a program 14 stored on the ROM 13. The RAM 12 stores therein data such as temporary data required in accordance with execution of the program 14 by the CPU 11. The ROM 13 is formed from a nonvolatile memory, in which a variety of data besides the above-described program 14 is stored in advance.

With its execution by the CPU 11, the program 14 brings the controller 10 into operation to serve as various types of processing parts. Especially in the first preferred embodiment, with execution of the program 14 by the CPU 11, the aforementioned image data generation function is allowed to be activated.

Figure 3:
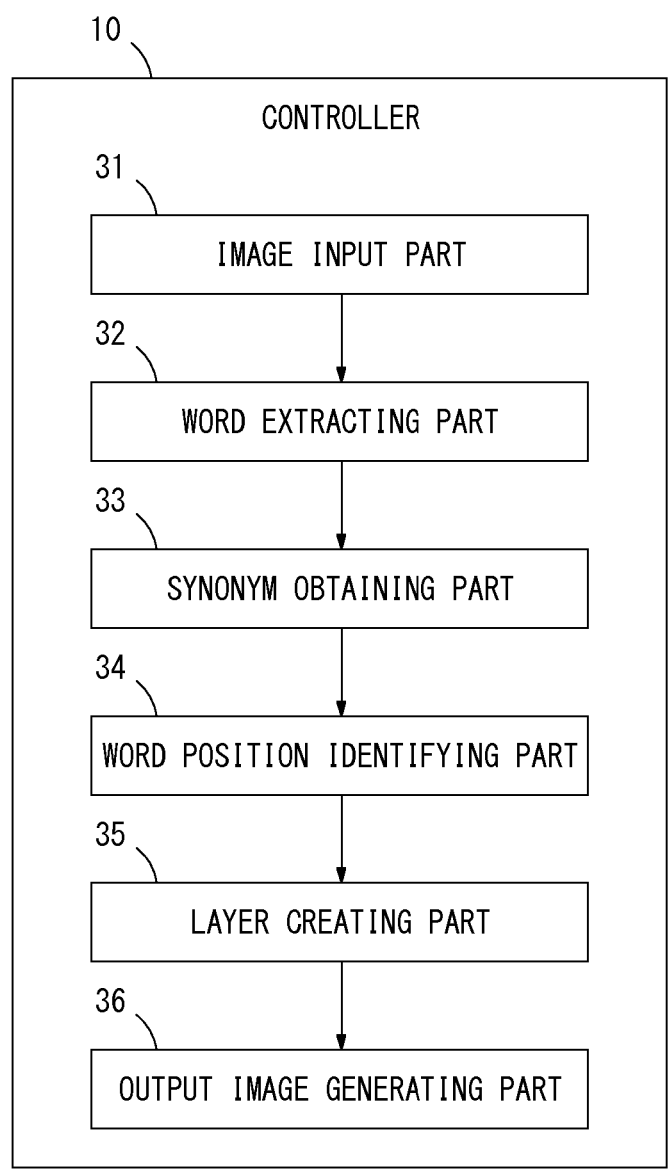
FIG. 3 is a block diagram showing an exemplary functional configuration of a controller when image data generation function is activated on the image processing device.

FIG. 3 is a block diagram showing an exemplary functional configuration of the controller 10 when the CPU 11 executes the program 14 to activate the image data generation function. As shown in FIG. 3, upon activation of the image data generation function on the image processing device 1, the controller 10 serves as an image input part 31, a word extracting part 32, a synonym obtaining part 33, a word position identifying part 34, a layer creating part 35 and an output image generating part 36. A processing performed by each processing part is explained next.

The image input part 31 acquires image data input as a target of process. The image input part 31 acquires the image data generated by the scanner section 24 by reading the document, for instance, as data to process. The image data, the target of process, is not always the image data generated by the scanner section 24. The image input part 31 may acquire the image data, the target of process, from another computer via the network interface 23, or from an external device via the external interface 27. Further, the image input part 31 may acquire fax data received by the fax section 26 as the image data to process, or image data stored in advance in the storage unit 28 as the image data to process.

FIG. 4 is an example of image data DA acquired by the image input part 31. The image data DA contains image data DA1 and DA2 of 2 pages. The image data DA1 and DA2 of the respective pages contain strings (texts). Those strings may be text data with a character code for each single character, but are not necessarily the text data. The strings may be those contained in images such as bitmap images, for instance. An exemplary case where the image input part 31 acquires the image data DA as shown in FIG. 4 is explained below.

The word extracting part 32 extracts words with meaning such as one of noun or verb, for example, one-by-one from strings contained in the image data DA, the target of process, acquired by the image input part 31. When the image data DA is the bitmap image, the word extracting part 32 performs character recognition process such as OCR (Optical Character Reader), then extracting the strings contained in the image data DA and converting the extracted strings into text data. If the strings contained in the image data DA are already text data, such character recognition process is not necessary. The word extracting part 32 extracts every word from all the strings extracted from the image data DA. This word extracting process is performed by using a well-known technique for extracting words contained in the strings. In this word extracting process, simple numbers, symbols or particles, each one of which would not have any meaning on its own, are not extracted.

FIG. 5 is an exemplary result of the word extracting process from the image data DA of FIG. 4 by the word extracting part 32. As the word extracting part 32 performs the word extracting process on the image data DA of FIG. 4, at least one word 41 in a rectangular box as illustrated in FIG. 5 that meets conditions for being a target of extraction is extracted from the strings contained in the image data DA1 and DA2 of each page. In the example of FIG. 5, multiple words 41 are extracted from the image data DA1 and DA2 of each page. The number of the word 41 extracted by the word extracting part 32 should not always be more than one. Only one word 41 may be extracted in some cases. If no word 41 is extracted by the word extracting part 32, rest of the process is not performed, and image data with which the synonym is embedded is not generated.

After the words 41 contained in the image data DA are extracted as shown in FIG. 5, the synonym obtaining part 33 is brought into operation next. The synonym obtaining part 33 obtains every synonym corresponding to the respective multiple words 41 extracted by the word extracting part 32. The synonym obtaining part 33 accesses an address registered in advance and refers to the synonym dictionary 5 stored on a storage of the address, thereby obtaining every synonym corresponding to the respective multiple words 41 extracted by the word extracting part 32. The synonym obtaining part 33 of the first preferred embodiment accesses the servers 3a and 3b over the network 2 which is connected to the network interface 23 and refers to the thesaurus dictionary 5a and the customized dictionary 5b stored in the corresponding server 3a and 3b, thereby obtaining the synonym corresponds to each word 41.

FIGS. 6A and 6B are examples of the thesaurus dictionary 5a and the customized dictionary 5b. As illustrated in FIGS. 6A and 6B, each of the thesaurus dictionary 5a and the customized dictionary 5b has the data structure that includes at least one synonym group, each of which having more than one word that is similar to or is likely to be relevant to each other. As already explained above, there are terms including common terms and standard terms categorized in each synonym group in the thesaurus dictionary 5a, and arbitrary terms registered by the user including industry parlances and terms commonly used in the company categorized in each synonym group in the customized dictionary 5b. The terms in the thesaurus dictionary 5a and the terms registered by the user may be categorized in the same synonym group in the customized dictionary 5b.

Figure 7:
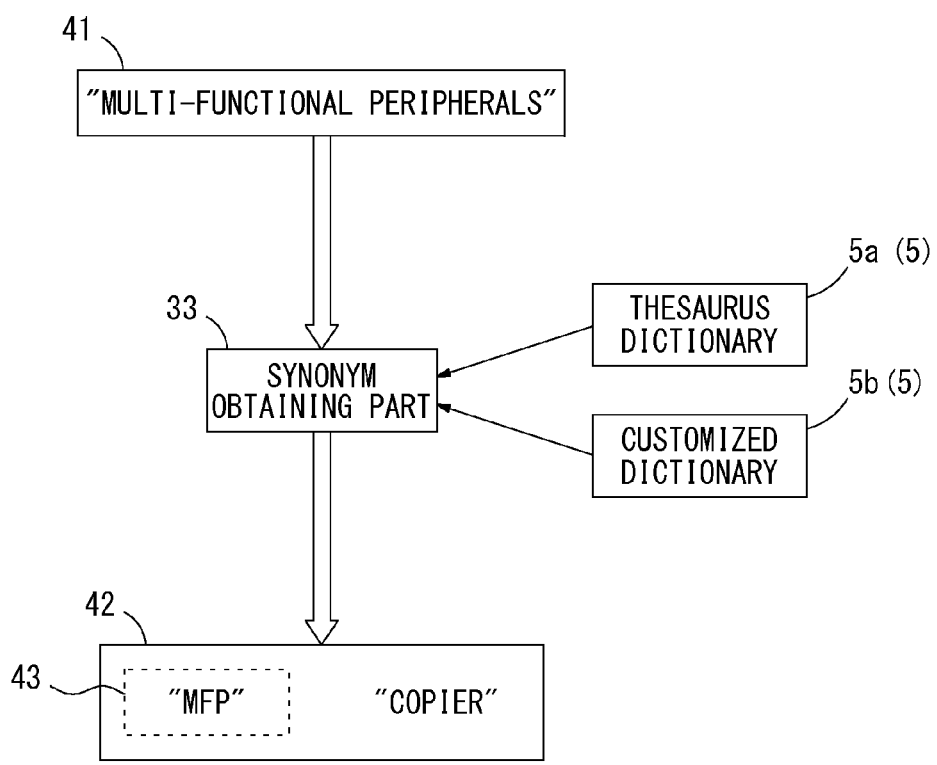
FIG. 7 shows a concept of synonym extraction by a synonym obtaining part.

The synonym obtaining part 33 refers to the aforementioned thesaurus dictionary 5a and customized dictionary 5b with a key term, that is each of the word 41 extracted from the image data DA, thereby extracting at least one synonym corresponding to each word 41. FIG. 7 shows a concept of synonym extraction by the synonym obtaining part 33. It is assumed, for example, the synonym corresponding to the word 41, "Multi-functional peripherals" extracted from the image data DA, is to be extracted. In this case, the synonym obtaining part 33 refers to the thesaurus dictionary 5a and the customized dictionary 5b with a key term, "Multi-functional peripherals," thereby specifying the synonym group that includes "Multi-functional peripherals." The synonym obtaining part 33 then obtains other words included in the specified synonym group as the synonyms. In the thesaurus dictionary 5a of FIG. 6A, "MFP" and "copier" are included in the same specified synonym group as "Multi-functional peripherals" as its synonyms. In the customized dictionary 5b of FIG. 6B, there is no "Multi-functional peripherals." As a result of obtaining synonyms by the key term, "Multi-functional peripherals" contained in the image data DA, the synonym obtaining part 33 extracts two words "MFP" and "copier" as synonyms 42 as shown in FIG. 7.

The synonym obtaining part 33 further refers to the aforementioned thesaurus dictionary 5a and customized dictionary 5b with key terms, the words obtained as the synonyms 42, and determines whether or not each word obtained as the synonym 42 is included in any of other synonym groups. If the word, the key term, is included in another synonym group, the synonym obtaining part 33 also obtains other words included in another synonym group as the synonyms 42. Thus, every other word that only corresponds to the extracted synonym may also be extracted as the synonym 42. The word obtained as the synonym 42 may not be included in any of other synonym group. In such a case, only the synonym 42 that corresponds to the word 41 contained in the image data DA is extracted.

The synonym obtaining part 33 extracts every synonym 42 that corresponds to each word 41 contained in the image data DA as described above, and associates the extracted synonym 42 with the corresponding word 41. As a result, at least one synonym 42 is separately associated with each word 41 contained in the image data DA.

Even when the synonym obtaining part 33 refers to the thesaurus dictionary 5a and customized dictionary 5b with the key term, the word 41 extracted from the image data DA, there may not be any extracted synonym 42. The word 41 with no extracted synonym 42 is excluded from the words, the target of later processing.

When extracting the synonym 42 that corresponds to the word 41 from the image data DA as described above, the synonym obtaining part 33 determines whether or not the extracted synonym 42 matches any of the other words 41 extracted from the image data DA. When the extracted synonym 42 matches any of the other words 41, the synonym obtaining part 33 defines another word 41 matches the synonym 42 as an inconsistent spelled word 43. By referring to the concept in FIG. 7, for example, the words "MFP" and "copier" are extracted as the synonyms 42 correspond to the word 41, "Multi-functional peripherals." In this case, it is determined whether or not any of other words 41 extracted from the image data DA matches either "MFP" or "copier." If the word 41 "MFP" has been extracted from the image data DA as shown in FIG. 5, the word 41 "MFP" matches "MFP" extracted as the synonym 42. The synonym obtaining part 33 then defines the synonym 42 "MFP" as the inconsistent spelled word 43 as illustrated in FIG. 7.

After the synonym obtaining part 33 performs the above-explained process for all the words 41 extracted from the image data DA, the word position identifying part 34 is brought into operation next. The word position identifying part 34 identifies a display position of the word 41 with which the synonym 42 is associated on the image data DA based on the process result by the synonym obtaining part 33. The word position identifying part 34 considers the word 41 with which the synonym 42 is associated by the synonym obtaining part 33 as a target of this process, and identifies where the word 41 is arranged on the image data DA. The word position identifying part 34 identifies a display position of a first character (a beginning position) of the word 41 with which the synonyms 42 is associated and a display area (display size) of all characters forming the word 41.

The layer creating part 35 is then brought into operation. The layer creating part 35 creates at least one accompanying layer to add to an original layer, which is the image data DA from which the word 41 is extracted. The layer creating part 35 embeds the synonyms 42 associated with the respective words 41 on the original layer within the created accompanying layer. The layer creating part 35 embeds the synonyms 42 associated with the respective words 41 within a position on the created accompanying layer to correspond to the display positions of the respective words 41 identified by the word position identifying part 34.

Figure 8A:
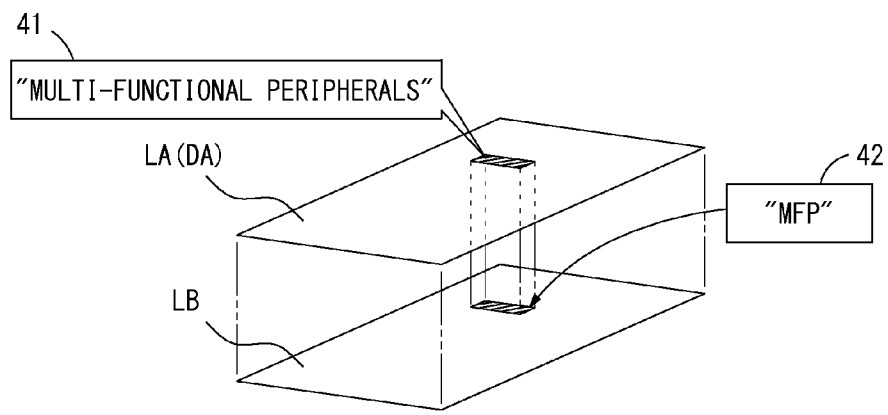
FIGS. 8A and 8B show concepts of an accompanying layer creating process and a synonym embedding process performed by a layer creating part.
Figure 8B:
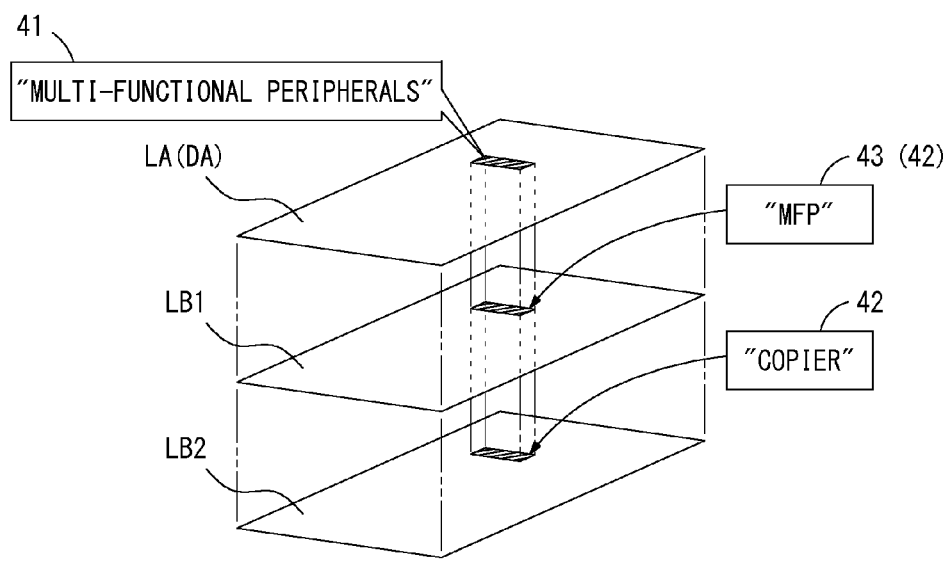

FIGS. 8A and 8B show concepts of the accompanying layer creating process and the synonym embedding process performed by the layer creating part 35. As shown in FIG. 8A, the layer creating part 35 sets the image data DA from which the word 41 is extracted as an original layer LA and creates an accompanying layer LB to add to the original layer LA. The layer creating part 35 embeds the synonym 42 associated with the word 41 within a position on the created accompanying layer LB the same as a position of the word 41 contained in the original layer LA. In the example of FIG. 8A, the synonym 42 "MFP" associated with the word 41 "Multi-functional peripherals" contained in the original layer LA is embedded within the position on the accompanying layer LB the same as that of the word 41.

The above-mentioned example where two synonyms 42 "MFP" and "copier" are extracted as the synonyms 42 corresponding to the word 41 "Multi-functional peripherals" is explained. As described above, if multiple synonyms 42 are extracted corresponding to the single word 41, the layer creating part 35 is not allowed to arrange all the multiple synonyms 42 corresponding to the word 41 on the position on one accompanying layer LB the same as that of the word 41. If multiple synonyms 42 are extracted corresponding to the single word 41 as described above, the layer creating part 35 creates more than one accompanying layer LB by increasing the number of the extracted synonyms 42 corresponding to the single word 41. More than one accompanying layer LB thereby created has a hierarchical structure.

In the example of FIG. 8B, two accompanying layers LB1 and LB2 are created by the layer creating part 35. When two synonyms 42 "MFP" and "copier" are extracted corresponding to the word 41 "Multi-functional peripherals," the layer creating part 35 creates the two accompanying layers LB1 and LB2 as shown in FIG. 8B. The layer creating part 35 then separately embeds each of the synonym 42 "MFP" and "copier" within the positions on the respective accompanying layers LB1 and LB2 the same as that of the word 41 "Multi-functional peripherals." The multiple synonyms 42 may include the synonym 42 defined as the inconsistent spelled word 43 of the word 41. In such a case, the layer creating part 35 embeds the synonym 42 defined as the inconsistent spelled word 43 within the accompanying layer LB1, which is the higher layer. The layer creating part 35 embeds the synonym 42 not defined as the inconsistent spelled word 43 within the accompanying layer LB2, which is the lower layer. In the example of FIG. 8B, the synonym 42 "MFP" is defined as the inconsistent spelled word 43. "MFP," therefore, is embedded within the accompanying layer LB1 which is the higher layer than the accompanying layer LB2, within which "copier" is being embedded.

When multiple synonyms 42 are defined as the inconsistent spelled words 43 of the word 41, the layer creating part 35 calculates appearance frequency in the image data DA of each of the multiple synonyms 42 defined as the inconsistent spelled word 43. The layer creating part 35 is configured to embed the synonym 42 within the accompanying layer LB from the highest layer in descending order of appearance frequency in the image data DA.

There are two ways of embedding the synonym 42 within the position on the accompanying layer LB the same as that of the word 41 on the original layer LA by the layer creating part 35. The first way is to embed the synonym 42 by causing a first character of the synonym 42 to match a first character of the word 41, and the second way is to embed the synonym 42 by causing a display area of the strings of the synonym 42 to match a display area of the strings of the word 41.

Figure 9A:
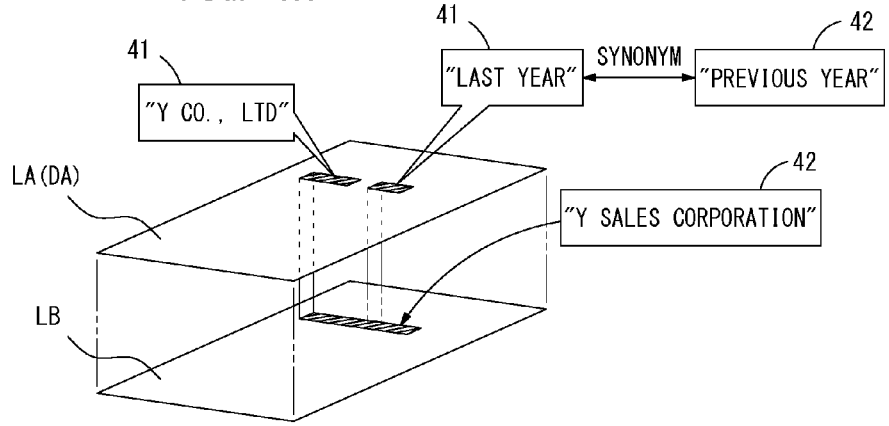
FIGS. 9A, 9B and 9C are conceptual figures explaining a first and a second embedding way for synonym embedding.
Figure 9B:
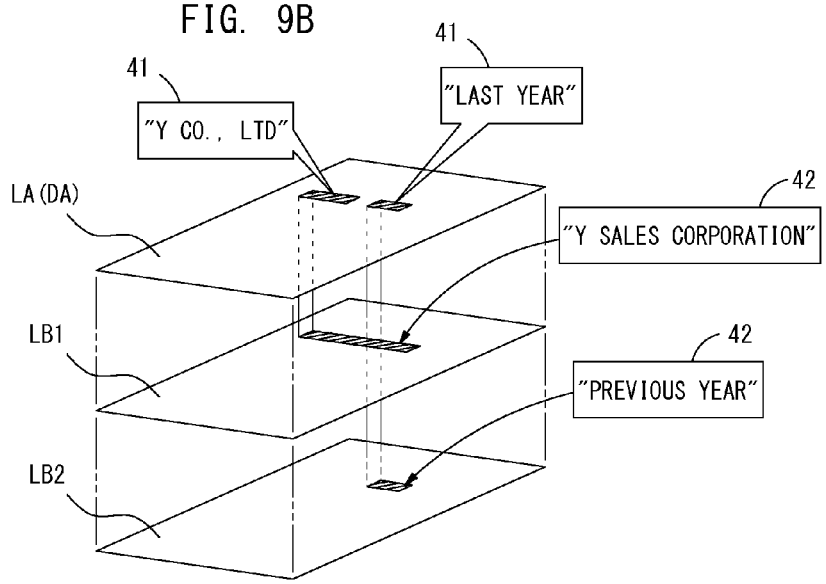
Figure 9C:
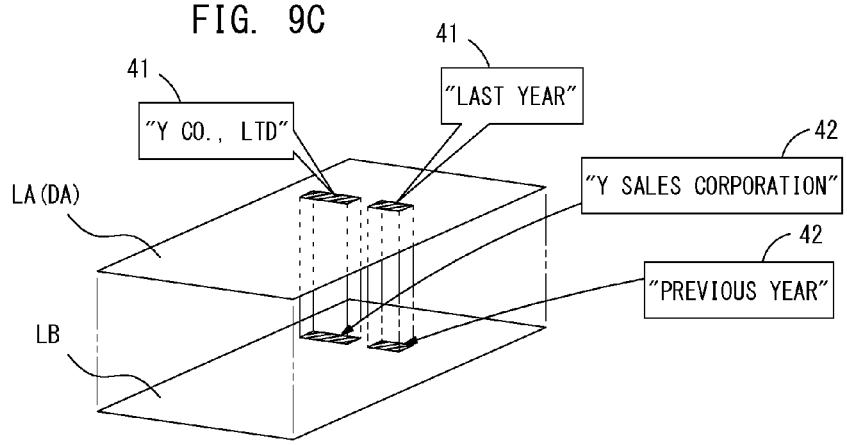

FIGS. 9A, 9B and 9C are conceptual figures explaining the first and second embedding way. FIGS. 9A and 9B show concepts of a synonym embedding process by the first way. As shown in FIG. 9A, for example, two words 41 "Y Co., Ltd" and "last year" are extracted from the same line of the texts contained in the original layer LA. In this case, the synonyms 42 "Y Sales Corporation" corresponding to "Y Co., Ltd" and "previous year" corresponding to "last year" are embedded within the accompanying layer LB. According to the first way, as illustrated in FIG. 9A, the first character of the synonym 42 "Y Sales Corporation" is arranged to match the first character of the word 41 "Y Co., Ltd" and is embedded within the accompanying layer LB. The number of characters of the synonym 42 "Y Sales Corporation," however, is more than that of the word 41 "Y Co., Ltd." The synonym 42 "Y Sales Corporation" embedded within the accompanying layer LB is being arranged out of the position (position of the first character), within which the synonym 42 corresponding to the word 41 "last year" should be embedded. So, the synonym 42 "previous year" corresponding to the word 41 "last year" is not allowed to be embedded within the same accompanying layer LB, within which the synonym 42 "Y Sales Corporation" is embedded. When the synonym 42 corresponding to the word 41 is not allowed to be embedded by matching the first character of the synonym 42 with the first character of the word 41, the layer creating part 35 creates the new accompanying layer LB as illustrated in FIG. 9B, thereby embedding the synonym 42 within the new created accompanying layer LB. In the example of FIG. 9B, the synonym 42 "previous year" corresponding to the word 41 "last year" is embedded within the second accompanying layer LB2 to match the position of the first character of the word 41 "last year."

According to the first way as described above, the synonym 42 is embedded to match the position of the first character of the synonym 42 with the position of the first character of the word 41. When the number of characters of the synonym 42 is more than that of the word 41, another synonym 42 may not be embedded within the same accompanying layer LB. The layer creating part 35, therefore, additionally creates the new accompanying layer LB as required to embed the synonym 42 within the position the same as that of the word 41 on the original layer LA.

FIG. 9C shows a concept of the synonym embedding process by the second way. According to the second way as shown in FIG. 9C, the display area of the synonym 42 "Y Sales Corporation" is converted to match the display area of the word 41 "Y Co., Ltd" and is embedded within the accompanying layer LB. To be more specific, the layer creating part 35 converts the synonym 42 to be embedded within the accompanying layer LB in different formats, thereby causing the display area (display size) of the synonym 42 to match the display area (display size) of the word 41 on the original layer LA. The different formats, in which the synonym 42 is converted, include resizing the fonts, or axial magnification change or orthogonal magnification change of the string forming the synonym 42, for example. In the example of FIG. 9C, the synonym 42 "Y Sales Corporation," consists of a large number of characters, is converted by reducing its orthogonal magnification to match the length of the string of the word 41 "Y Co., Ltd." As a result, the display area of the synonym 42 is matched the display area of the word 41. For embedding the synonym 42 "Y Sales Corporation" within the accompanying layer LB, the synonym 42 "Y Sales Corporation" is allowed to be embedded without being out of the display area of the word 41 "Y Co., Ltd." Thus, the synonym 42 "previous year" corresponding to another word 41 "last year" may also be embedded within the same accompanying layer LB, within which the synonym 42 "Y Sales Corporation" is embedded, as shown in FIG. 9C.

In the example of FIG. 9C, the synonym 42 is converted by reducing its orthogonal magnification to match the length of the string of the word 41 when the synonym 42 to be embedded within the accompanying layer LB consists of a larger number of characters than the word 41. However, the synonym 42 is converted in deferent formats other than by reducing its orthogonal magnification. If, for example, the synonym 42 to be embedded within the accompanying layer LB consists of a less number of characters than the word 41, for example, the synonym 42 may be converted by expanding its orthogonal magnification to cause the display area of the synonym 42 to match the display area of the word 41.

The layer creating part 35 may use either of the first or the second way to create the accompanying layer LB and embed the synonym 42. Either of the aforementioned two ways may be set in advance with the image processing device 1, for example, and the layer creating part 35 may use the way set in advance to embed the synonym 42. Alternatively, it may make the user choose either of the aforementioned two ways in response to activating the image data generation function on the image processing device 1. If the synonym 42 is embedded with the second way of the aforementioned two ways, it is allowed to make the number of the accompanying layers LB created by the layer creating part 35 as little as possible.

Figure 10:
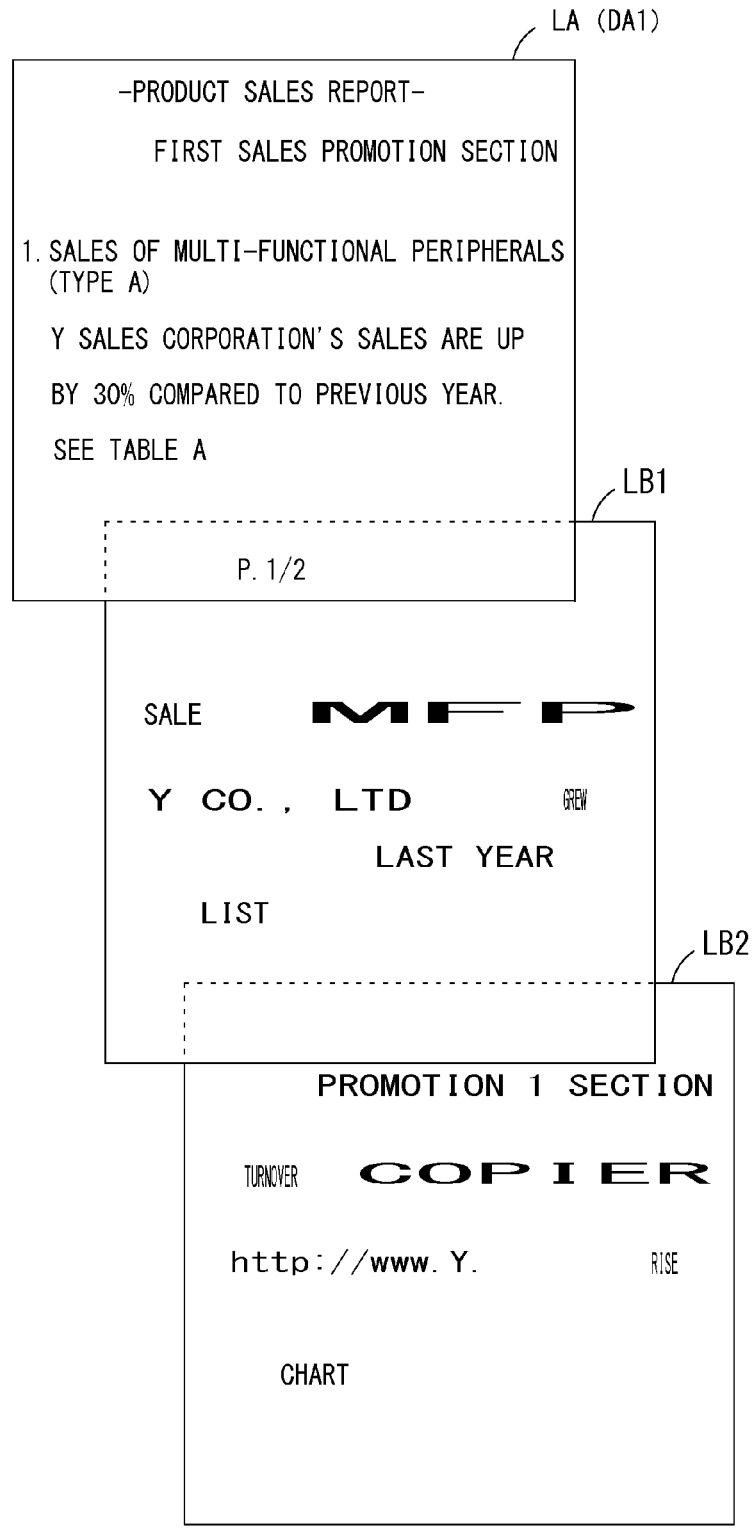
FIG. 10 shows an example of accompanying layers within which each synonym corresponds to a word extracted from the image data is embedded.
Figure 11:
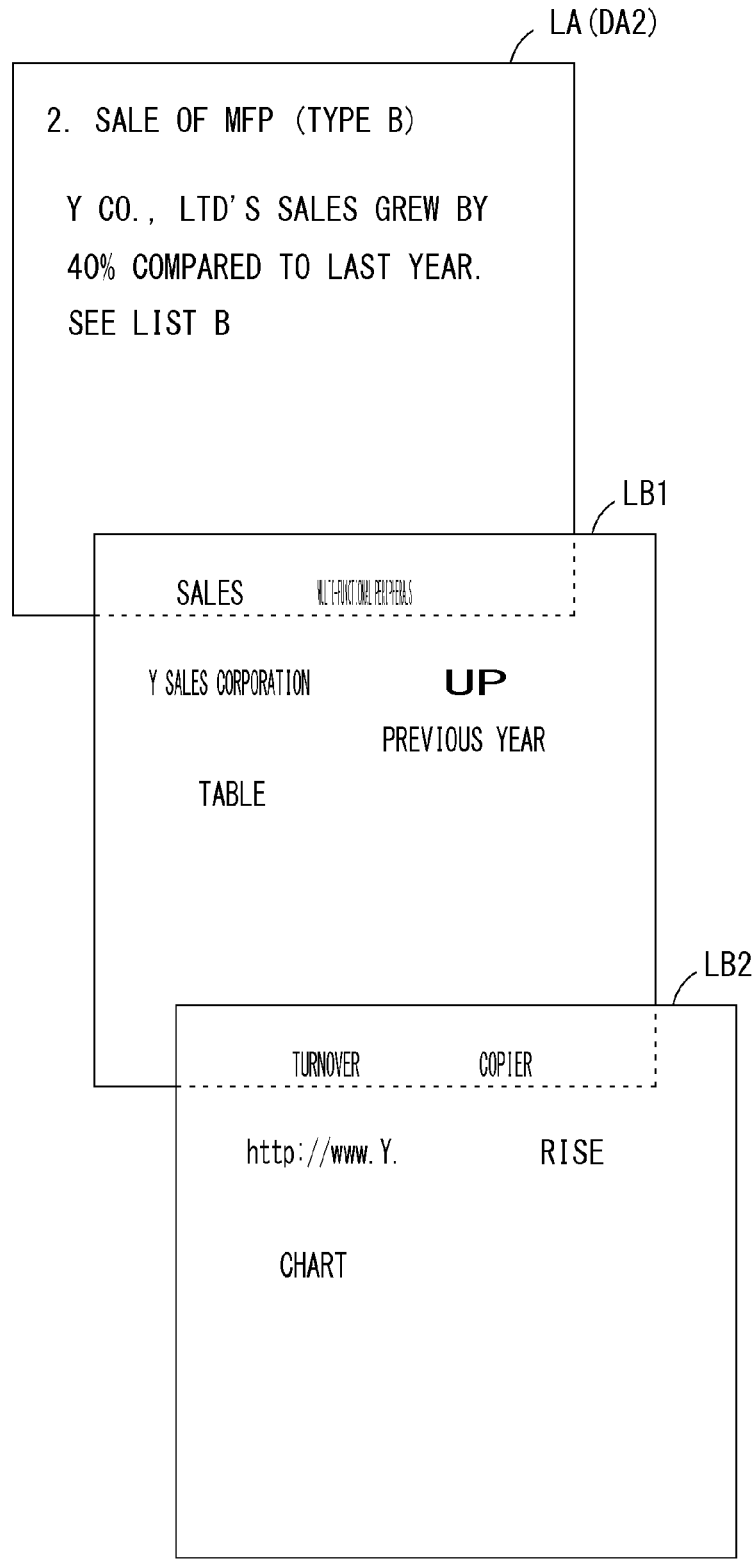
FIG. 11 shows another example of the accompanying layers within which each synonym corresponds to the word extracted from the image data is embedded.

The layer creating part 35 separately performs the above-explained process to every page contained in the image data DA, thereby adding the accompanying layer LB to the image data DA1 and DA2 corresponds to the respective pages and embedding the synonym 42 with the added accompanying layer LB. FIG. 10 shows an example of the accompanying layers LB1 and LB2 within which the synonyms 42 correspond to the respective words 41 extracted from the image data DA1 of FIG. 5 are embedded. FIG. 11 shows the accompanying layers LB1 and LB2 within which the synonyms 42 correspond to the respective words 41 extracted from the image data DA2 of FIG. 5 are embedded. The above-described second way is used to embed the synonyms 42 in examples of FIGS. 10 and 11.

When the image data DA1 of the first page of FIG. 5 is considered as the original layer LA as shown in FIG. 10, the layer creating part 35 embeds the inconsistent spelled words 43 of the synonyms 42 correspond to the respective words 41 extracted from the image data DA1 that are written in the same page or another page within the accompanying layer LB1, the highest layer. The rest of the synonyms 42, not the inconsistent spelled words 43, are embedded within the accompanying layer LB2, the lower layer. All the synonyms 42 embedded within the first accompanying layer LB1 in FIG. 10 are the inconsistent spelled words 43 written in the image data DA2 of the second page. The synonyms 42 embedded within the second accompanying layer LB2 in FIG. 10 are the simple synonyms 42 not written in either the image data DA1 or DA2 of the first or the second page.

When the image data DA2 of the second page of FIG. 5 is considered as the original layer LA as shown in FIG. 11, the layer creating part 35 embeds the inconsistent spelled words 43 of the synonyms 42 correspond to the respective words 41 extracted from the image data DA2 that are written in the same page or another page within the accompanying layer LB1, the highest layer. The rest of the synonyms 42, not the inconsistent spelled words 43, are embedded within the accompanying layer LB2, the lower layer. All the synonyms 42 embedded within the first accompanying layer LB1 in FIG. 11 are the inconsistent spelled words 43 written in the image data DA1 of the first page. The synonyms 42 embedded within the second accompanying layer LB2 in FIG. 11 are the simple synonyms 42 not written in either the image data DA1 or DA2 of the first or the second page.

After the layer creating part 35 embeds all the synonyms 42 as described above, the output image generating part 36 is brought into operation next. The output image generating part 36 generates single output image data by adding at least one accompanying layer LB created by the layer creating part 35 to the original layer LA. To be more specific, the output image consists of multiple layers including the original layer LA and the accompanying layer LB. The output image generating part 36 outputs the image data after generating it by adding the accompanying layer LB to the original layer LA. The image data thereby generated may be output to the storage unit 28 or the external device connected to the external interface 27. Alternatively, the image data may be output to another computer over the network 2 via the network interface 23.

Figure 12:
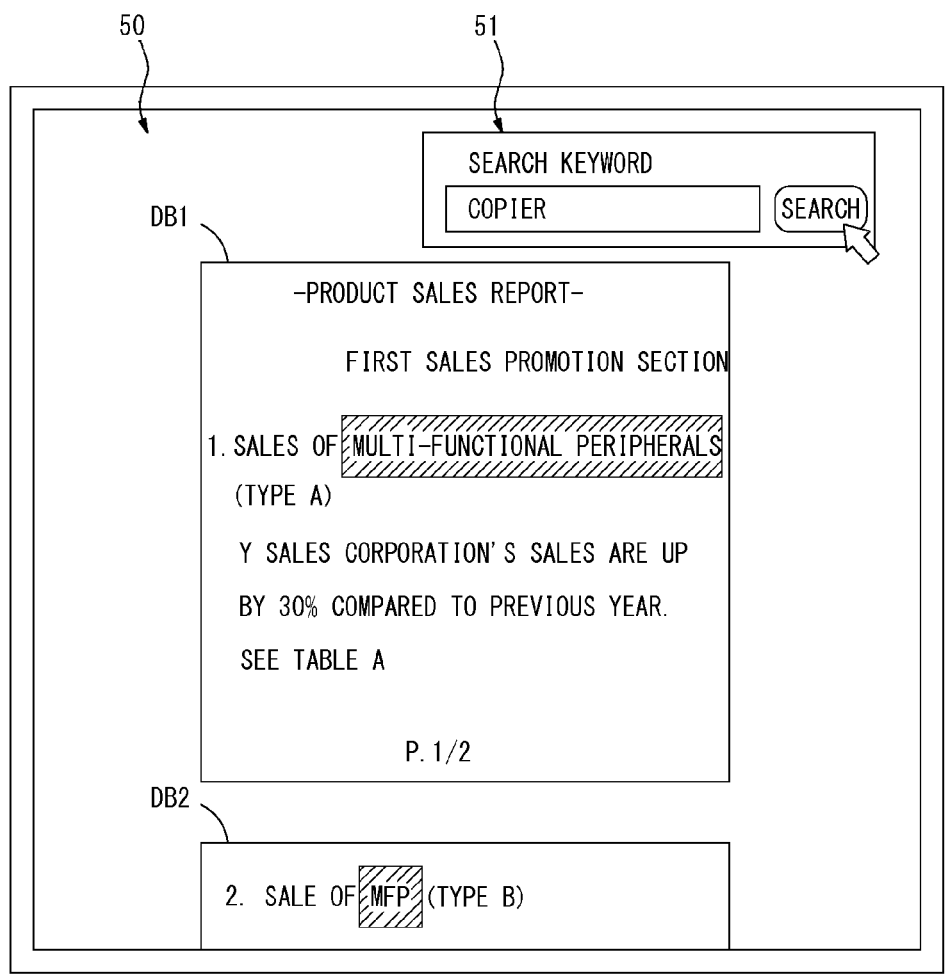
FIG. 12 shows an exemplary result of a keyword search performed by a user with displaying the image data output from the image processing device on a display of a device such as a computer.

FIG. 12 shows an exemplary result of the keyword search performed by the user with displaying the image data output as described above on a display 50 of a device such as the computer. As illustrated in FIG. 12, image data DB1 of a first page and image data DB2 of a second page contained in the output image data from the image processing device 1 is displayed on the display 50 of the device such as the computer, for example, which allows scrolling the viewing area. Only the image of the original layer LA of the multiple layers included in the output image is displayed by default on the display 50, and the image of the accompanying layer LB is not displayed.

With the display on the display 50, the user specifies to perform the keyword search. In this case, a search image 51 to enter the search keyword is appeared on the viewing area of the display 50. The user enters a desired keyword in the search image 51 and specifies execution of the search. The search process to look for the word that matches the entered keyword is then performed. It is assumed, for example, that searching for the terms that are likely to be relevant to "Multi-functional peripherals" is performed. In this case, when the user is used to use the term "copier" for searching, he or she enters the keyword "copier" in the search image 51 as shown in FIG. 12 and clicks a search button. In such a case, a search engine on the device such as the computer performs the search by the keyword "copier" through the original layer LA and the accompanying layer LB included in the respective image data DB1 and DB2. The synonym 42 "copier" embedded within the accompanying layer LB is then found as a result of the search. The search engine then highlights the display position of the found synonym 42 with displaying the image of the original layer LA, and is allowed to show the words like "Multi-functional peripherals" and "MFP," that are the synonyms of "copier," as a search result as shown in FIG. 12. Therefore, for the user, even he or she performs the search with the keyword he or she is used to use, every synonym corresponds to the keyword may be obtained as the search result.

Much image data generated as explained above may be stored on the database. With such database, the user may search for the desired image data from the much image data stored on the database to use the desired image data. Even in such a case, every image data that contains the word similar to the search keyword entered by the user may be extracted. It is not necessary to register in advance the data for search with the database as it has with the conventional ways so that every image data that contains the word similar to the search keyword entered by the user may be extracted without failure without being influenced by an environment under which the user performs the search.

The image data generated as explained above may be attached to an email and sent to another user. Even in such a case, when another user performs the keyword search through the attached image data, every synonym corresponds to the keyword may be searched. Even with the single image data, a search for the text contained in the image data is easily performed.

With the search result being displayed on the display 50 as shown in FIG. 12, some users would like to check the accompanying layer LB found by the search keyword "copier." In such a case, the user switches the displayed layer from the original layer LA to the desired accompanying layer LB chosen by him or her, thereby checking the content of each accompanying layer LB.

The sequential procedures performed on the aforementioned image processing device 1 are described next. FIGS. 13 to 16 are flow diagrams explaining exemplary sequential procedures of the process performed when the aforementioned image data generation function is activated on the image processing device 1. This process is performed upon execution of the above-mentioned program 14 by the CPU 11 on the controller 10 of the image processing device 1.

Figure 13:
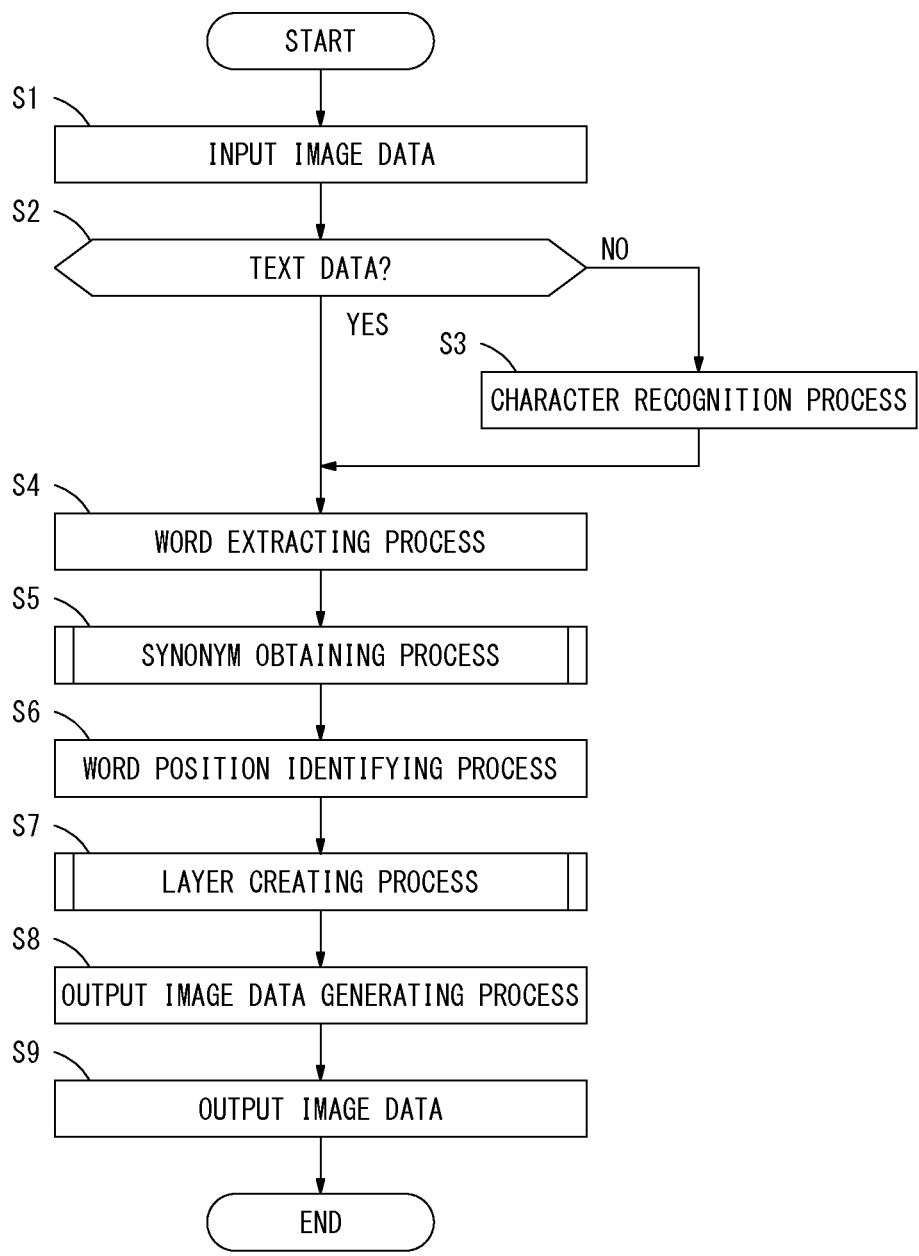
FIG. 13 is a flow diagram explaining an exemplary sequential procedure of the process performed when the image data generation function is activated on the image processing device of a first preferred embodiment.

Upon start of this process as shown in FIG. 13, the controller 10 inputs the image data DA, the target of process (step S1), and determines whether or not the input image data DA is the text data (step S2). When the image data DA is not the text data (when a result of step S2 is NO), the controller 10 performs the character recognition process to convert the strings contained in the image data DA to the text data (step S3). The controller 10 performs the word extracting process (step S4) to extract all the words 41 contained in the image data DA as shown in FIG. 5.

Figure 14:
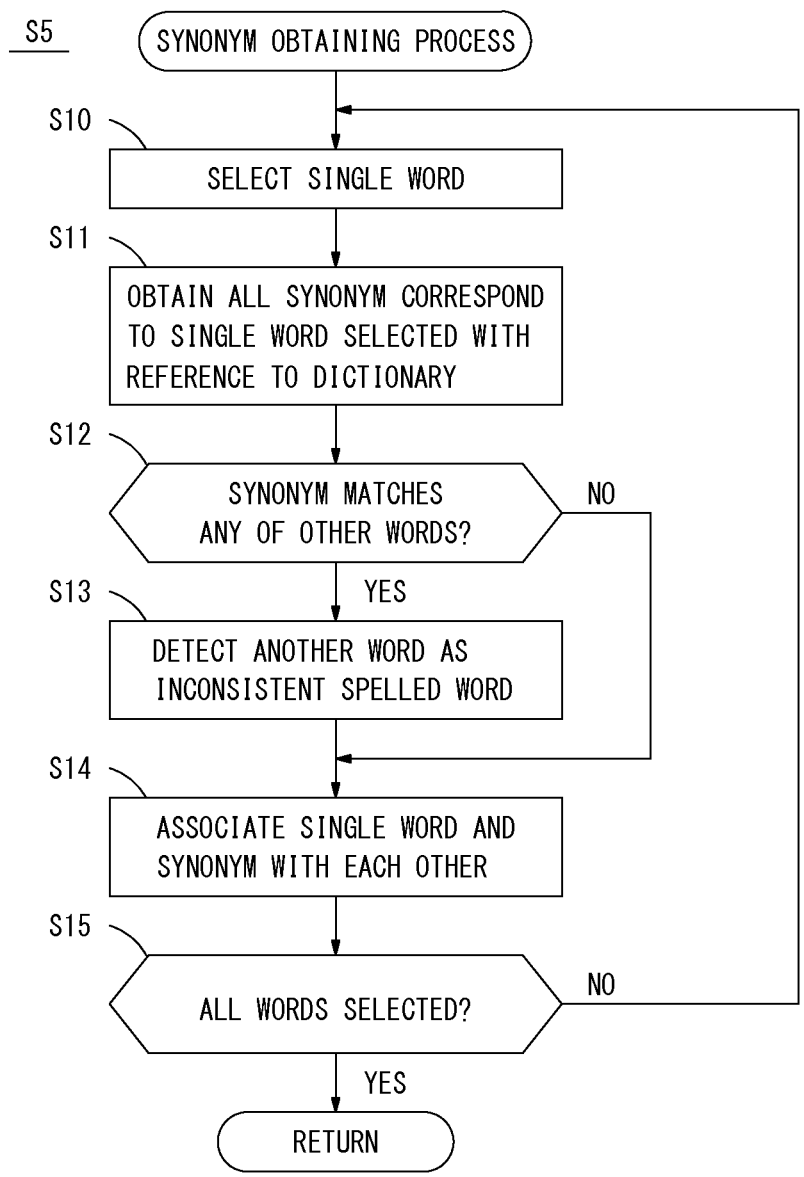
FIG. 14 is a flow diagram explaining the detailed exemplary sequential procedure of a synonym obtaining process.

The controller 10 performs the synonym obtaining process (step S5) next. FIG. 14 is a flow diagram explaining the detailed exemplary sequential procedure of the synonym obtaining process (step S5). Upon the start of the process, one of the words 41 extracted with the word extracting process (step S4) is selected (step S10), and obtains all the synonyms 42 correspond to the single word 41 selected with reference to the synonym dictionary 5 including the thesaurus dictionary 5a and the customized dictionary 5b set in advance (step S11). If no synonym 42 corresponds to the selected single word 41 is obtained, the process in steps S12, S13 and S14 is skipped. When at least one synonym 42 corresponds to the selected word 41 is obtained, the process moves onto step S12.

The controller 10 then determines if the obtained synonym 42 matches any of other words 41 contained in the image data DA (step S12). When any of the synonyms 42 matches another word 41, the synonym 42 is detected as the inconsistent spelled word 43 (step S13). The controller 10 associates the single word 41 selected in step S10 and the obtained synonym 42 with each other and temporarily stores them (step S14). The controller 10 determines whether or not the above-described process is performed for all the words 41 extracted in step S4 (step S15). If there is any unselected word 41, the controller 10 returns to step S10 to repeatedly perform the above-explained process. When the above-described process for all the words 41 is completed, the synonym obtaining process (step S5) is complete.

Referring back to FIG. 13, the controller 10 performs the word position identifying process (step S6). In this word position identifying process (step S6), the display positions on the image data DA of the respective words 41 with which the synonyms 42 are associated are identified.

Figure 15:
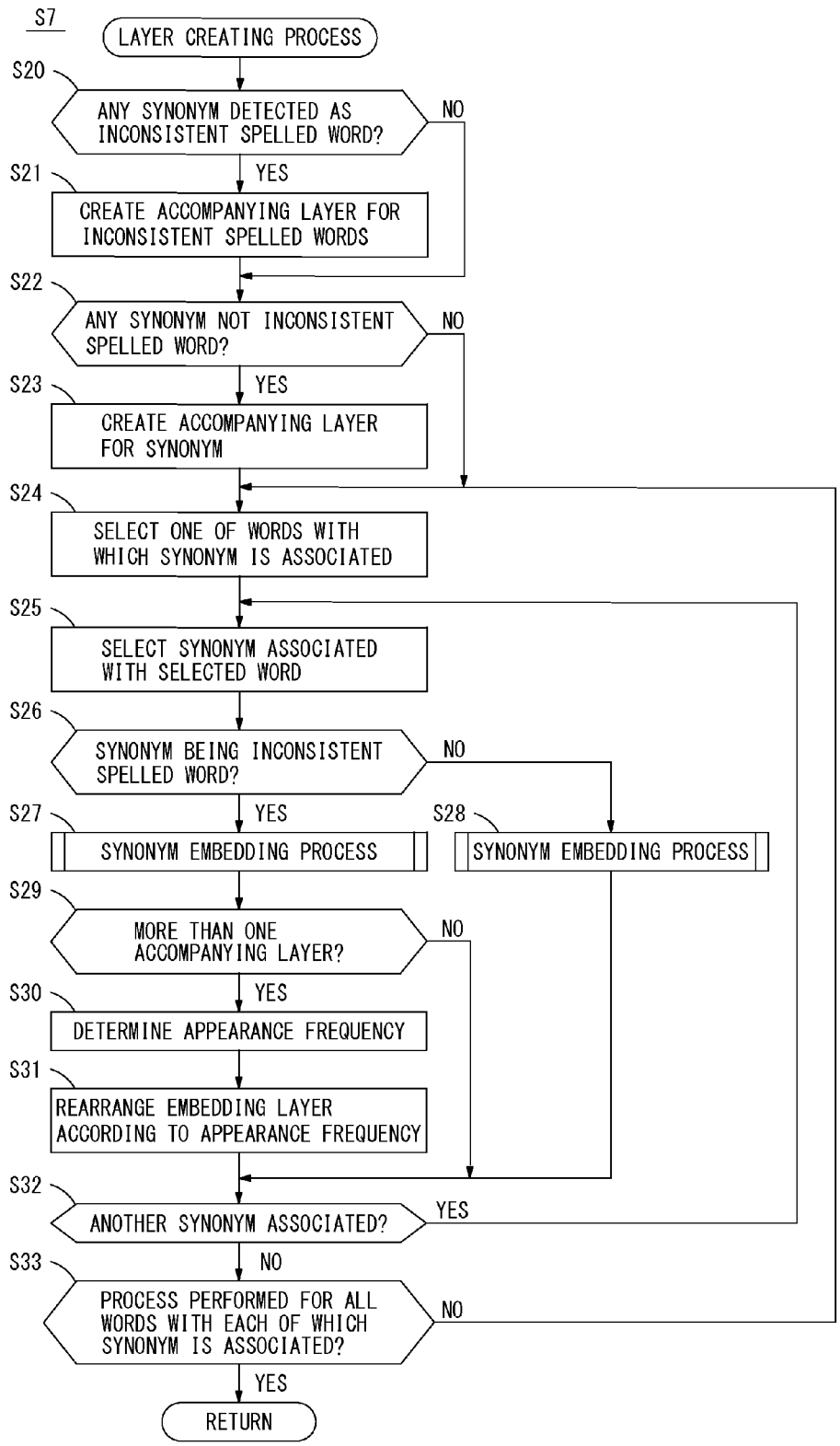
FIG. 15 is a flow diagram explaining the detailed exemplary sequential procedure of a layer creating process.

The controller 10 performs the layer creating process (step S7). FIG. 15 is a flow diagram explaining the detailed exemplary sequential procedure of the layer creating process (step S7). Upon the start of this process, the controller 10 determines if there is any synonym 42 detected as the inconsistent spelled word 43 (step S20). When the inconsistent spelled word 43 is detected (when a result of step S20 is YES), the controller 10 creates the highest accompanying layer LB1 for the inconsistent spelled words (step S21). The controller 10 determines if there is any synonym 42 that is not the inconsistent spelled word 43 (step S22). When there is the synonym 42 that is not the inconsistent spelled word 43 (when a result of step S22 is YES), the controller 10 creates the lower accompanying layer LB2 for the synonyms (step S23).

The controller 10 then selects one of the words 41 with which at least one synonym 42 is associated (step S24), and selects one of the at least one synonym 42 associated with the selected word 41 (step S25). The controller 10 determines whether or not the selected synonym 42 is the inconsistent spelled word 43 (step S26). When it is determined that the selected synonym 42 is the inconsistent spelled word 43 (when a result of step S26 is YES), the controller 10 performs the synonym embedding process to the accompanying layer LB1 for the inconsistent spelled words (step S27). When the synonym 42 is not the inconsistent spelled word 43 (when a result of step S26 is NO), the controller 10 performs the synonym embedding process to the accompanying layer LB2 for the synonyms (step S28).

Figure 16:
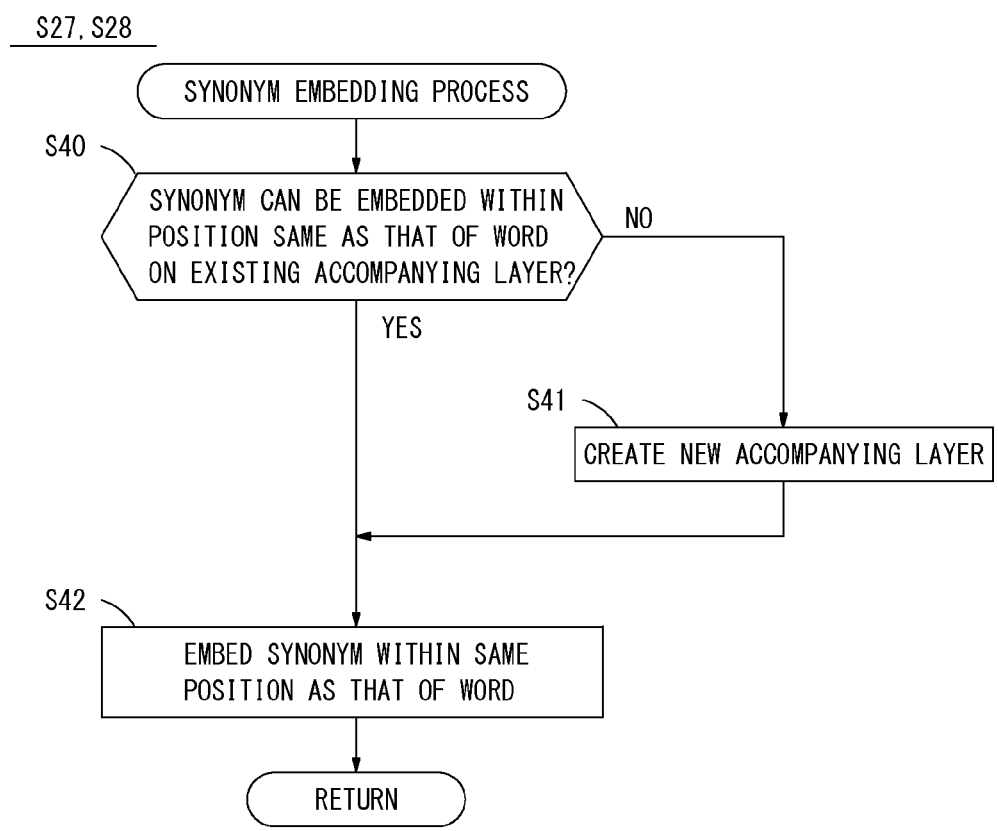
FIG. 16 is a flow diagram explaining the detailed exemplary sequential procedure of the synonym embedding process.

FIG. 16 is a flow diagram explaining the detailed exemplary sequential procedure of the synonym embedding process (steps S27 and S28). In response to starting this process, the controller 10 determines whether or not the synonym 42 is allowed to be embedded within the position the same as that of the word 41 on the existing accompanying layer (step S40). When the synonym 42 is not allowed to be embedded within the position the same as that of the word 41 (when a result of step S40 is NO), the controller 10 creates the new accompanying layer LB (step S41). In response to embedding the synonym 42 within the accompanying layer for the inconsistent spelled words, the controller 10 creates the new accompanying layer for the inconsistent spelled words. In response to embedding the synonym 42 within the accompanying layer for the synonyms, the controller 10 creates the new accompanying layer for the synonyms. The controller 10 then embeds the synonym 42 within the same position as that of the word 41 on the existing accompanying layer or the newly created accompanying layer (step S42). The process returns to the flow diagram of FIG. 15.

In response to embedding the synonym within the accompanying layer LB1 for the inconsistent spelled words (step S27), the controller 10 determines whether or not there is more than one accompanying layer for the inconsistent spelled words (step S29). If there is more than one accompanying layer for the inconsistent spelled words (when a result of step S29 is YES), the controller 10 determines the appearance frequency in the image data DA of the synonym 42 embedded as the inconsistent spelled word 43 within each accompanying layer (step S30). The controller 10 rearranges the embedding layer in a different order according to the appearance frequency (step S31). Thus, the synonym 42 embedded as the inconsistent spelled word 43 is replaced to the higher accompanying layer in descending order of appearance frequency in the image data DA.

The controller 10 then determines if there is still another synonym 42 associated with the same single word 41 (step S32). When there is another synonym 42 (when a result of step S32 is YES), the controller 10 returns to step S25 to repeat the above-explained process. When there is no other synonym 42 associated with the same single word 41 (when a result of step S32 is NO), the controller 10 determines whether or not the above-explained process is performed for all the words 41 with each of which at least one synonym 42 is associated (step S33). When there is any unprocessed word 41 (when a result of step S33 is NO), the controller 10 returns to step S24 to repeat the above-explained process. By finishing the above-explained process for all the unprocessed words 41 (when a result of step S33 is YES), the controller 10 completes the layer creating process (step S7).

Referring back to FIG. 13, the controller 10 then adds at least one accompanying layer LB created in the layer creating process (step S7) to the original layer LA, which is the input image data DA, thereby generating the image data to output (step S8). The controller 10 then outputs the generated image data to an address designated in advance by the user, and completes the whole process (step S9).

The image processing device 1 performs a series of process as explained above, thereby generating the image data consists of multiple layers including the original layer LA, which is the input image data DA, and at least one accompanying layer LB, with which the synonyms 42 correspond to the respective words 41 contained in the original layer LA are embedded. The image data thereby generated allows the user to easily perform text search, and is not likely to cause failure to obtain all the relevant search result as described above.

As described above, the image processing device 1 of the first preferred embodiment comprises the word extracting part 32, the synonym obtaining part 33, the word position identifying part 34, the layer creating part 35 and the output image generating part 36. The word extracting part 32 extracts at least one word 41 from the texts contained in the input image data DA, and the synonym obtaining part 33 obtains at least one synonym 42 corresponding to the extracted word 41 and associates the obtained synonym 42 with the word 41. The word position identifying part 34 identifies the display position on the image data DA of the word 41 with which the synonym 42 is associated. The layer creating part 35 creates at least one accompanying layer LB to add to the original layer LA, which is the image data DA containing the word 41, and embeds the synonym 42 associated with the word 41 within a position on the created accompanying layer LB the same as the display position identified by the word position identifying part 34. The output image generating part 36 generates the output image data including the original layer LA containing the word 41 and the accompanying layer LB within which the synonym 42 is embedded.

The image data generated as described above includes the accompanying layer LB within which the synonym 42 corresponding to the word 41 contained in the image data DA is embedded. The synonym 42 embedded within the accompanying layer LB is embedded within the position the same as the display position of the word 41 on the original layer LA. The text search through the output image data by the keyword not contained in the original layer LA may be performed. Even in such a case, the synonym 42 embedded within the accompanying layer LB receives a hit, and it allows showing as a search result where the word 41 similar to or likely to be relevant to the keyword is contained in the original layer LA. The image processing device 1 of the first preferred embodiment is capable of generating the image data that allows obtaining the search result including the word 41 similar to the keyword without being influenced by the environment under which the search is performed when the user enters the keyword to do the search.

When multiple synonyms 42 are obtained corresponding to the single word 41 by the synonym obtaining part 33, the layer creating part 35 of the image processing device 1 of the first preferred embodiment creates more than one accompanying layer LB1 and LB2, thereby embedding each of the multiple synonyms 42 associated with the single word 41 within the corresponding accompanying layer LB1 or LB2. Each of the multiple synonyms 42 corresponding to the single word 41 may be embedded within the position the same as the display position of the word 41 on each accompanying layer LB1 and LB2.

After the synonym obtaining part 33 obtains the multiple synonyms 42 corresponding to the single word 41, the image processing device 1 of the first preferred embodiment determines whether or not each obtained synonym 42 matches another word 41 extracted from the image data DA. When it is considered a match, the image processing device 1 defines that the single word 41 and another word 41 are the inconsistent spelled words 43 of each other. For embedding the synonym 42 within the accompanying layer LB, the layer creating part 35 is capable of embedding another word 41 within a position the same as the display position corresponding to the single word 41, and the single word 41 within a position the same as the display position corresponding to another word 41. As a result, when text search is performed through the output image data, not only the synonym 42 similar to the keyword but also the inconsistent spelled word 43 having the same meanings but spelled in several different ways contained in the image data DA may be detected.

If there are multiple other words 41 defined as the inconsistent spelled words 43 of the single word 41 by the synonym obtaining part 33, the image processing device 1 of the first preferred embodiment causes the layer creating part 35 to create more than one accompanying layer LB1 and LB2 having the hierarchical structure, and to embed each of the other words 41 defined as the inconsistent spelled words 43 of the single word 41 within the respective accompanying layers LB1 and LB2. Thus, each of other words 41 defined as the inconsistent spelled words 43 of the single word 41 is allowed to be embedded within the position the same as the display position of the single word 41 on the corresponding accompanying layers LB1 or LB2.

When the layer creating part 35 embeds each of the other words 41 defined as the inconsistent spelled words 43 of the single word 41 within the corresponding accompanying layer LB1 or LB2, the image processing device 1 of the first preferred embodiment embeds other words 41, in descending order of appearance frequency in the image data DA, within the respective accompanying layers LB1 and LB2 from the highest layer. More specifically, one of the other words 41 appeared most in the image data DA is embedded within the highest accompanying layer LB1, and another word 41 appeared more in the image data DA is embedded within the second highest accompanying layer LB2. So, when the user switches the screen to show another layer as the output image data is being displayed on the device such as the computer, the inconsistent spelled word 43 appeared most in the original image data DA is displayed prior to rest of the other words 41. The user, therefore, is allowed to check the inconsistent spelled word 43 in the image data DA efficiently. In other words, if there is the inconsistent spelled word 43 in the image data DA, the image processing device 1 of the first preferred embodiment is capable of effectively making the user notice the inconsistent spelled word 43 and correct it. Thus, the image processing device 1 of the first preferred embodiment is allowed to support document editing and creating for the user.

When the layer creating part 35 embeds the synonym 42 associated with the word 41 within the accompanying layer LB, the image processing device 1 of the first preferred embodiment arranges the first character of the synonym 42 to match the first character of the word 41 on the original layer LA. If there is already another synonym 42 being arranged to match the first character of the word 41, another accompanying layer LB is newly created to arrange the synonym 42 to match the first character of the word 41 on the additionally created accompanying layer LB. As described above, even when multiple synonyms 42 correspond to the single word 41 are extracted, the first character of each synonym 42 may be arranged to match the first character of the word 41 on the original layer LA and embedded within the respective accompanying layers LB.

When the layer creating part 35 embeds the synonym 42 associated with the word 41 within the accompanying layer LB, the image processing device 1 of the first preferred embodiment converts the synonym 42 in different formats, thereby causing the display area of the synonym 42 to match the display area of the word 41 on the original layer LA and embedding the synonym 42 within the accompanying layer LB. As described above, when the synonym 42 embedded within the accompanying layer LB receives a hit in the text search through the output image data, an area that matches the display area of the word 41 on the original layer LA may be displayed as a hit area. Failures to show only a part of the display area of the word 41 on the original layer LA as the hit area or to show other characters consecutive to the word 41 on the original layer LA as the hit area may be avoided. Further, it may appropriately inform the user of the area of the word 41 receiving a hit with the search keyword.

As described above, the image data allowing to obtain the search results including the word similar to the keyword when the user performs the search by entering the keyword without being influenced by the environment under which the text search is performed may be generated. As a result, operation burden on the user may be reduced and occurrences of failures to obtain all the relevant search results may be effectively prevented.

Second Preferred Embodiment

The second preferred embodiment is described next. In the first preferred embodiment described above, in response to obtaining the synonym 42 corresponding to the word 41 contained in the image data DA, the synonym 42 that is the inconsistent spelled word 43 is determined, and the synonym 42 that is the inconsistent spelled word 43 and the simple synonym 42 are embedded within the respective accompanying layers LB after separating them with each other. In the second preferred embodiment, these synonym 42 that is the inconsistent spelled word 43 and the simple synonym 42 are not separated from each other for embedding. The obtained synonym 42 corresponding to the word 41 is distinguished by types. The synonym 42 of each type is embedded within the corresponding accompanying layer LB. This way of distinguishing is explained in the second preferred embodiment. The hardware configuration and the functional configuration of the image processing device 1 of the second preferred embodiment are the same as ones described in the first preferred embodiment.

Figure 17:
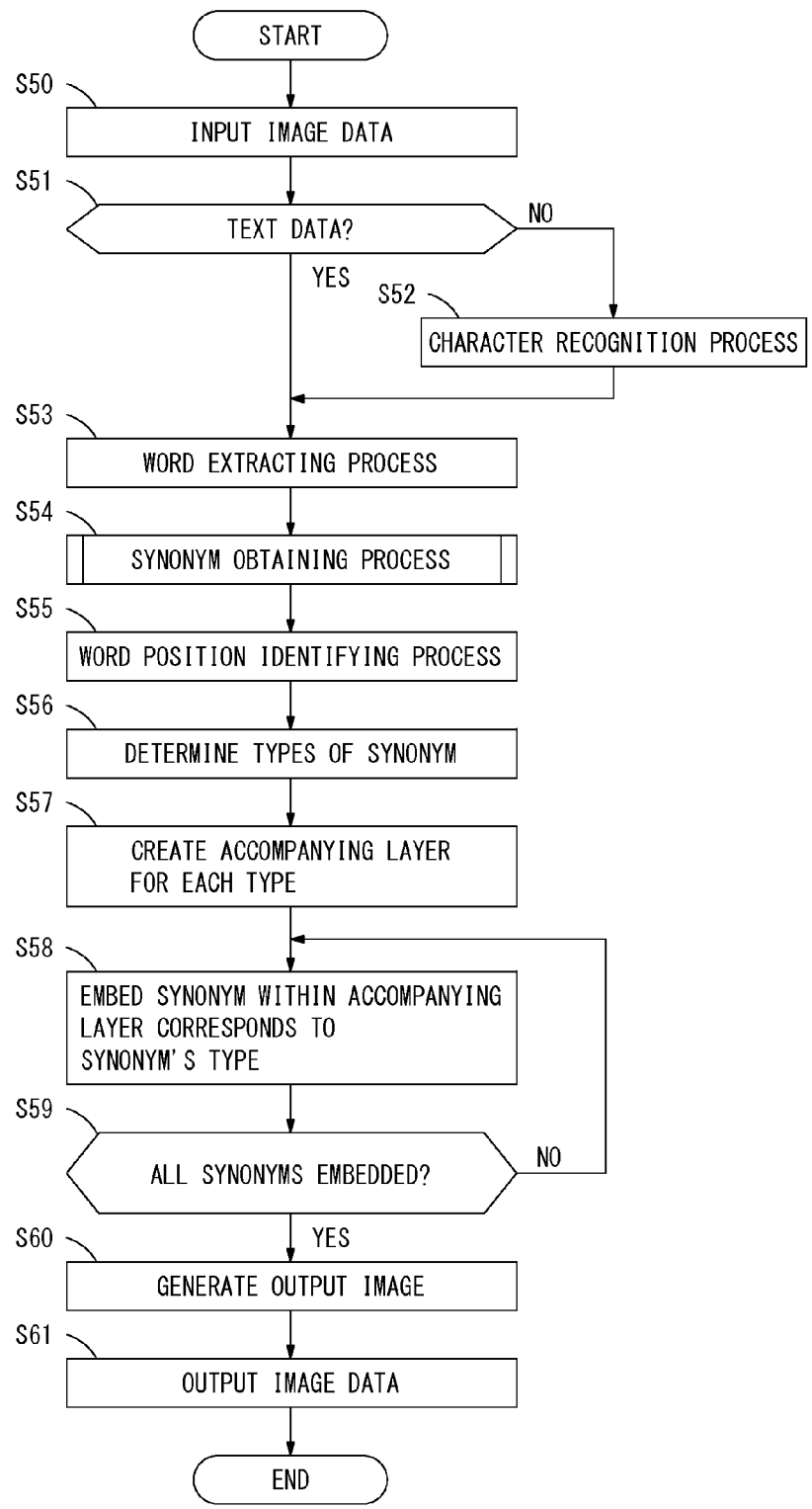
FIG. 17 is a flow diagram explaining an exemplary sequential procedure of the process performed when the image data generation function is activated on the image processing device of a second preferred embodiment.

FIG. 17 is a flow diagram explaining an exemplary sequential procedure of the process performed when the image data generation function is activated on the image processing device 1 of the second preferred embodiment. This process is started upon the execution of the aforementioned program 14 by the CPU 11 on the controller 10 of the image processing device 1, the same as in the first preferred embodiment.

Upon start of this process as shown in FIG. 17, the controller 10 inputs the image data DA, the target of process (step S50), and determines whether or not the input image data DA is the text data (step S51). When the image data DA is not the text data (when a result of step S51 is NO), the controller 10 performs the character recognition process to convert the strings contained in the image data DA to the text data (step S52). The controller 10 performs the word extracting process (step S53) to extract all the words 41 contained in the image data DA as shown in FIG. 5.

The controller 10 performs the synonym obtaining process (step S54). The detail of the synonym obtaining process (step S54) is as already explained with FIG. 14. After the synonym obtaining process (step S54), the controller 10 performs the word position identifying process to identify the display position on the image data DA of every word 41 with which the synonym 42 is associated (step S55).

The controller 10 then determines the types of the synonym 42 obtained in the synonym obtaining process (step S54) (step S56). The types of the synonym 42 are for example types of languages. The types may also be the types of terms that distinguish the general terms, the terms commonly used in a company, the industry parlances and academic terms, or even other types. According to the second preferred embodiment, the type of the term is registered in advance with each term in the synonym dictionary 5 including the thesaurus dictionary 5a and the customized dictionary 5b, for example. The controller 10 refers to the types of the term in the synonym dictionary 5 to determine the type of each synonym 42. It, however, is not limited to this. The types of the synonym 42 may be determined for each synonym dictionary 5 in which there is the synonym 42 obtained in the synonym obtaining process (step S54).

After determining the type of the synonym 42 as described above, the controller 10 creates the accompanying layer LB for each determined type of the synonym 42 (step S57). The controller 10 embeds each synonym 42 obtained in the synonym obtaining process (step S54) within the accompanying layer LB corresponds to the type (step S58). The controller 10 embeds each synonym 42 within a position on the accompanying layer LB corresponds to the synonym's type to match the display position of the word 41 on the original layer LA as described in the first preferred embodiment. For embedding the synonym 42, the controller 10 additionally creates the new accompanying layer LB if necessary to embed the synonym 42 within the position to match the display position of the word 41 on the original layer LA as described in the first preferred embodiment. The controller 10 performs the above-explained process until embedding all the synonyms 42 (step S59).

The controller 10 generates the image data to output by adding the at least one accompanying layer LB created for each type of the synonym 42 to the original layer LA, which is the image data DA input as the target of the process (step S60). The controller 10 then outputs the generated image data to the address designated by the user in advance, and completes the whole process (step S61).

The image processing device 1 of the second preferred embodiment performs the above-described series of process, thereby generating the image data consists of multiple layers including the original layer LA formed from the input image data DA and the accompanying layer LB in which the synonym 42 corresponding to each word 41 contained in the original layer LA is embedded, as well as in the first preferred embodiment. Especially in the second preferred embodiment, the image data that includes the accompanying layers LB to be added to the original layer LA, within each of which the synonyms 42 of the same type are embedded, may be generated.

Figure 18A:
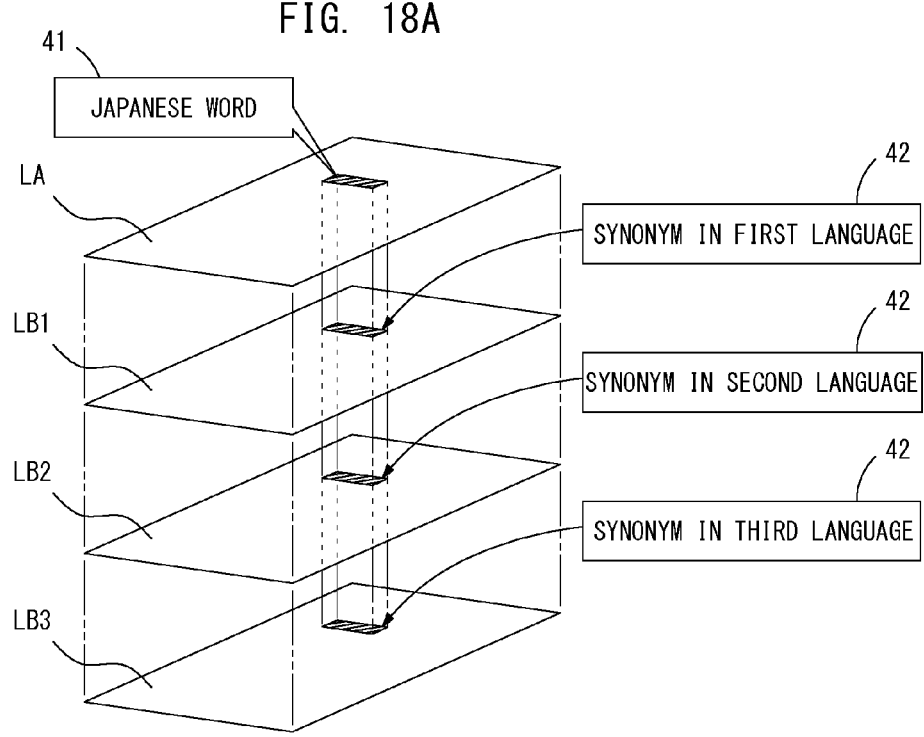
FIGS. 18A and 18B show examples of the image data generated by the image processing device of the second preferred embodiment.
Figure 18B:
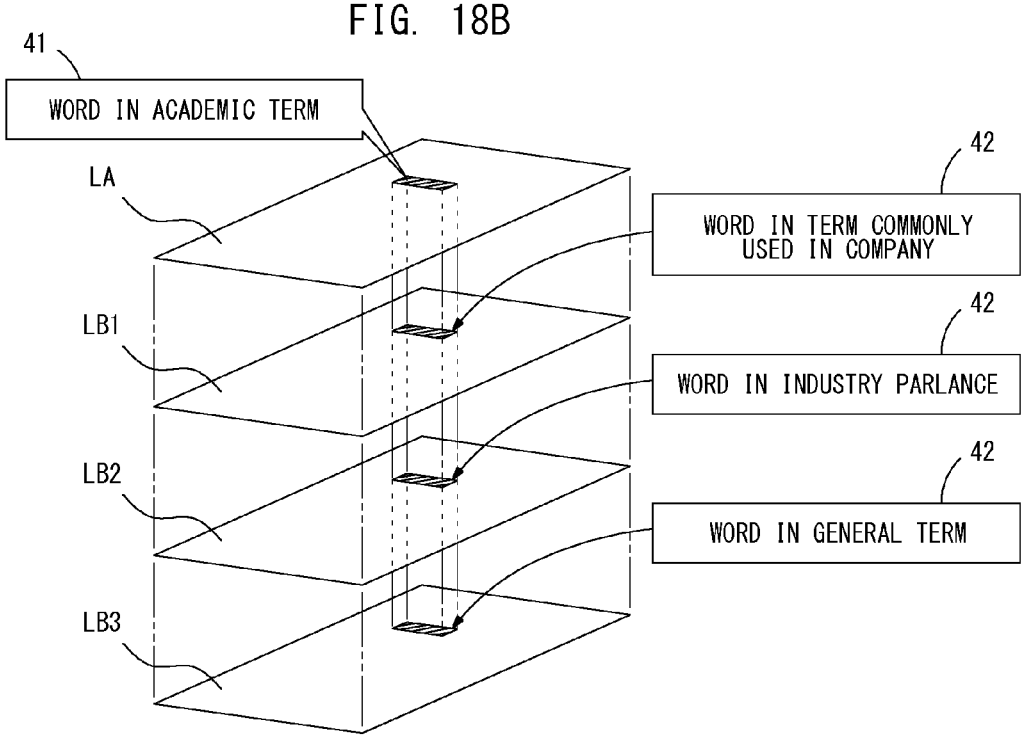

FIGS. 18A and 18B show examples of the image data generated by the image processing device 1 of the second preferred embodiment. The image data of FIG. 18A has the data structure consists of the original layer LA, the first accompanying layer LB1, the second accompanying layer LB2 and the third accompanying layer LB3. The Japanese word 41 is contained in the original layer LA, and the synonym 42, the word having the same meaning as the Japanese word 41 in the first language (for instance, English), is embedded within the first accompanying layer LB1. The synonym 42, the word having the same meaning as the Japanese word 41 in the second language (for instance, Chinese), is embedded within the second accompanying layer LB2, and the synonym 42, the word having the same meaning as the Japanese word 41 in the third language (for instance, Korean), is embedded within the third accompanying layer LB3. In response to performing the keyword search by entering a Japanese word through such image data, the user is allowed to know the synonym expressions in other languages for the keyword. Moreover, even when the user who is not familiar with Japanese performs the keyword search in his or her mother language such as English, for example, he or she may specify the display position of the word 41 in Japanese for the keyword.

The image data of FIG. 18B has the data structure consists of the original layer LA, the first accompanying layer LB1, the second accompanying layer LB2 and the third accompanying layer LB3. The word 41 expressed in the academic term is contained in the original layer LA, and the synonym 42 expressed in the term commonly used in the company, the word having the same meaning as the word 41, is embedded within the first accompanying layer LB1. The synonym 42 expressed in the industry parlance, the word having the same meaning as the word 41, is embedded within the second accompanying layer LB2, and the synonym 42 expressed in the general term, the word having the same meaning as the word 41, is embedded within the third accompanying layer LB3. In response to performing the keyword search by entering a term such as the term commonly used in the company, the industry parlance or the general term through such image data, the user who is not familiar with the academic terms is allowed to get a hit to the display position of the word 41 in the academic term for the keyword.

As the synonym obtaining part 33, the same as the one of the first preferred embodiment, obtains the synonym 42 corresponding to the word 41, the image processing device 1 of the second preferred embodiment determines the types of the obtained synonym 42. The layer creating part 35 creates the accompanying layer LB for each type of the synonym 42 determined by the synonym obtaining part 33, and embeds the synonym 42 associated with the word 41 within the accompanying layer LB according to the type of the synonym 42 to embed. The image data thereby generated consists of at least one accompanying layer LB within which the synonyms 42 categorized in the same type obtained corresponding to the word 41 contained in the image data DA input as described above are embedded. As a result, the user is allowed to know the types of the synonyms 42 by switching the displayed layer when the search results are displayed after performing the text search.

In the second preferred embodiment, as well as the first preferred embodiment, the image processing device 1 is capable of detecting the inconsistent spelled word 43 and embeds the detected inconsistent spelled word 43 within another accompanying layer LB by distinguishing between the inconsistent spelled word 43 and the simple synonym 42.

(Modifications)

While the preferred embodiments of the present invention have been described above, the present invention is not limited to the preferred embodiments. Various modifications may be applied to the present invention.

In the present preferred embodiments described above, the image processing device 1 is shown to be one of MFPs with multiple functions, for example. The image processing device 1 of the present invention is not necessarily the device such as one of the MFPs including multiple functions. The aforementioned program 14 may be installed on a device such as a general personal computer (PC), and the above-explained image data generation function may be activated by starting up the program 14 on the computer. In this case, the program 14 may be installed on the computer over the network such as the internet. Alternatively, the program 14 recorded on a computer readable recording medium such as a CD-ROM may be installed on the computer. Together with installation of the program 14 on the general computer, the aforementioned synonym dictionary 5 including the thesaurus dictionary 5a may be installed on the computer.

What is claimed is:
1. An image processing device, comprising:
a processor that executes:
an input part for inputting image data;
a word extracting part for extracting a word from texts contained in said image data;
a synonym obtaining part for obtaining a synonym corresponding to said word, and for associating said obtained synonym with said word;
a position identifying part for identifying a display position on said image data of said word with which said synonym is associated;
a layer creating part for creating an accompanying layer to add to an original layer, which is said image data containing said word, and for embedding said synonym associated with said word within a position on said accompanying layer that is the same as the display position of the word in said original layer identified by said position identifying part so that the synonym in the accompanying layer overlaps the word in the original layer without replacing the word in the original layer, wherein the location of a first character of the synonym in the accompanying layer matches the location of a first character of the word in the original layer, or the display area of the synonym in the accompanying layer has the same size as the display area of the word in the original layer and is at the same location in the accompanying layer as the display area of the word in the original layer; and
an output image generating part for generating output image data including said original layer containing said word and said accompanying layer within which said synonym is embedded and overlaps the word.

2. The image processing device according to claim 1, wherein
said layer creating part, when said synonym obtaining part obtains multiple synonyms corresponding to said single word, creates more than one said accompanying layer and embeds each of said multiple synonyms associated with said single word within said different accompanying layer.

3. The image processing device according to claim 1, wherein
said synonym obtaining part defines said single word and another word extracted from said image data as inconsistent spelled words when said synonym corresponding to said single word matches said another word; and
said layer creating part embeds said another word within a position on said accompanying layer the same as the display position of said single word identified by said position identifying part, and embeds said single word within a position on said accompanying layer the same as a display position of said another word identified by said position identifying part.

4. The image processing device according to claim 3, wherein
said layer creating part creates said more than one accompanying layer having a hierarchical structure when multiple other words are defined by said synonym obtaining part as the inconsistent spelled words of said single word, and embeds each of said other words defined as the inconsistent spelled words of said single word within a position on said different accompanying layer the same as the display position of said single word identified by said position identifying part.

5. The image processing device according to claim 4, wherein
said layer creating part embeds one of said other words within one of said more than one accompanying layer from the highest layer in descending order of appearance frequency in said image data for embedding each of said other words defined as the inconsistent spelled words of said single word within said different accompanying layer of said more than one accompanying layer.

6. The image processing device according to claim 1, wherein
said layer creating part, when embedding said synonym associated with said word within said accompanying layer, arranges said synonym to match its first character with the first character of said word on said original layer, and creates a new accompanying layer in addition if another synonym has already been arranged to match the first character of said word, thereby arranging said synonym to match its first character with the first character of said word on said created new accompanying layer.

7. The image processing device according to claim 1, wherein
said layer creating part, when embedding said synonym associated with said word within said accompanying layer, converts said synonym in different formats, thereby causing a display area of said synonym to match a display area of said word on said original layer and embedding said synonym within said accompanying layer.

8. The image processing device according to claim 1, wherein
said synonym obtaining part determines a type of said synonym corresponds to said word after obtaining said synonym, and
said layer creating part creates said accompanying layer for each type of said synonym determined by said synonym obtaining part, and embeds said synonym associated with said word within said accompanying layer corresponding to the type of said synonym.

9. An image processing method, comprising the steps of:
(a) inputting image data;
(b) extracting a word from texts contained in said image data;
(c) obtaining a synonym corresponding to said word, and associating said obtained synonym with said word;
(d) identifying a display position on said image data of said word with which said synonym is associated;
(e) creating an accompanying layer to add to an original layer, which is said image data containing said word, and embedding said synonym associated with said word within a position on said accompanying layer that is the same as the display position of the word in said original layer identified in said step (d) so that the synonym in the accompanying layer overlaps the word in the original layer without replacing the word in the original layer, wherein the location of a first character of the synonym in the accompanying layer matches the location of a first character of the word in the original layer, or the display area of the synonym in the accompanying layer has the same size as the display area of the word in the original layer and is at the same location in the accompanying layer as the display area of the word in the original layer; and
(f) generating output image data including said original layer containing said word and said accompanying layer within which said synonym is embedded and overlaps the word.

10. The image processing method according to claim 9, wherein
in said step (e), when multiple synonyms corresponding to said single word is obtained in said step (c), more than one said accompanying layer is created and each of said multiple synonyms associated with said single word is embedded within a position on said different accompanying layer the same as the display position identified in said step (d).

11. The image processing method according to claim 9, wherein
in said step (c), when said synonym corresponding to said single word matches another word extracted from said image data, said single word and said another word are defined as inconsistent spelled words; and
in said step (e), said another word is embedded within a position on said accompanying layer the same as the display position of said single word identified in said step (d), and said single word is embedded within a position on said accompanying layer the same as a display position of said another word identified in said step (d).

12. The image processing method according to claim 11, wherein
in said step (e), when multiple other words are defined in said step (c) as the inconsistent spelled words of said single word, said more than one accompanying layer having a hierarchical structure is created, and each of said other words defined as the inconsistent spelled words of said single word is embedded within a position on said different accompanying layer the same as the display position of said single word identified in said step (d).

13. The image processing method according to claim 12, wherein
in said step (e), for embedding each of said other words defined as the inconsistent spelled words of said single word within said different accompanying layer of said more than one accompanying layer, one of said other words is embedded within one of said more than one accompanying layer from the highest layer in descending order of appearance frequency in said image data.

14. The image processing method according to claim 9, wherein
in said step (e), when embedding said synonym associated with said word within said accompanying layer, said synonym is arranged to match its first character with the first character of said word on said original layer, and a new accompanying layer is created in addition if another synonym has already been arranged to match the first character of said word so that said synonym is arranged to match its first character with the first character of said word on said created new accompanying layer.

15. The image processing method according to claim 9, wherein
in said step (e), when embedding said synonym associated with said word within said accompanying layer, said synonym is converted in different formats to cause a display area of said synonym to match a display area of said word on said original layer and said synonym is embedded within said accompanying layer.

16. The image processing method according to claim 9, wherein
in said step (b), a type of said synonym corresponds to said word is determined after obtaining said synonym, and
in said step (e), said accompanying layer is created for each type of said synonym determined in said step (b), and said synonym associated with said word is embedded within said accompanying layer corresponding to the type of said synonym.

17. A non-transitory computer readable recording medium on which a program is recorded, said program executed on a computer to function as a system comprising:
an input part for inputting image data;
a word extracting part for extracting a word from texts contained in said image data;
a synonym obtaining part for obtaining a synonym corresponding to said word, and for associating said obtained synonym with said word;
a position identifying part for identifying a display position on said image data of said word with which said synonym is associated;
a layer creating part for creating an accompanying layer to add to an original layer, which is said image data containing said word, and for embedding said synonym associated with said word within a position on said accompanying layer that is the same as the display position of the word in said original layer identified by said position identifying part so that the synonym in the accompanying layer overlaps the word in the original layer without replacing the word in the original layer, wherein the location of a first character of the synonym in the accompanying layer matches the location of a first character of the word in the original layer, or the display area of the synonym in the accompanying layer has the same size as the display area of the word in the original layer and is at the same location in the accompanying layer as the display area of the word in the original layer; and
an output image generating part for generating output image data including said original layer containing said word and said accompanying layer within which said synonym is embedded and overlaps the word.

18. The non-transitory computer readable recording medium according to claim 17, wherein
said layer creating part, when said synonym obtaining part obtains multiple synonyms corresponding to said single word, creates more than one said accompanying layers and embeds each of said multiple synonyms associated with said single word within said different accompanying layer.

19. The non-transitory computer readable recording medium according to claim 17, wherein
said synonym obtaining part defines said single word and another word extracted from said image data as inconsistent spelled words when said synonym corresponding to said single word matches said another word; and
said layer creating part embeds said another word within a position on said accompanying layer the same as the display position of said single word identified by said position identifying part, and embeds said single word within a position on said accompanying layer the same as a display position of said another word identified by said position identifying part.

20. The non-transitory computer readable recording medium according to claim 19, wherein
said layer creating part creates said more than one accompanying layer having a hierarchical structure when multiple other words are defined by said synonym obtaining part as the inconsistent spelled words of said single word, and embeds each of said other words defined as the inconsistent spelled words of said single word within a position on said different accompanying layer the same as the display position of said single word identified by said position identifying part.

21. The non-transitory computer readable recording medium according to claim 20, wherein
said layer creating part embeds one of said other words within one of said more than one accompanying layer from the highest layer in descending order of appearance frequency in said image data for embedding each of said other words defined as the inconsistent spelled words of said single word within said different accompanying layer of said more than one accompanying layer.

22. The non-transitory computer readable recording medium according to claim 17, wherein
said layer creating part, when embedding said synonym associated with said word within said accompanying layer, arranges said synonym to match its first character with the first character of said word on said original layer, and creates a new accompanying layer in addition if another synonym has already been arranged to match the first character of said word, thereby arranging said synonym to match its first character with the first character of said word on said created new accompanying layer.

23. The non-transitory computer readable recording medium according to claim 17, wherein
said layer creating part, when embedding said synonym associated with said word within said accompanying layer, converts said synonym in different formats, thereby causing a display area of said synonym to match a display area of said word on said original layer and embedding said synonym within said accompanying layer.

24. The non-transitory computer readable recording medium according to claim 17, wherein
said synonym obtaining part determines a type of said synonym corresponds to said word after obtaining said synonym, and
said layer creating part creates said accompanying layer for each type of said synonym determined by said synonym obtaining part, and embeds said synonym associated with said word within said accompanying layer corresponding to the type of said synonym.

\* \* \* \* \*